United States Patent
Han

(10) Patent No.: US 12,332,701 B2
(45) Date of Patent: Jun. 17, 2025

(54) ELECTRONIC DEVICE HAVING TORQUE STRUCTURE

(71) Applicant: SAMSUNG ELECTRONICS CO., LTD., Suwon-si (KR)

(72) Inventor: Yonghwa Han, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 225 days.

(21) Appl. No.: 18/190,988

(22) Filed: Mar. 28, 2023

(65) Prior Publication Data

US 2023/0236641 A1 Jul. 27, 2023

Related U.S. Application Data

(63) Continuation of application No. PCT/KR2021/015705, filed on Nov. 2, 2021.

(30) Foreign Application Priority Data

Nov. 18, 2020 (KR) .................. 10-2020-0154757

(51) Int. Cl.
*G06F 1/16* (2006.01)
*E05D 3/12* (2006.01)
*E05D 11/08* (2006.01)

(52) U.S. Cl.
CPC .......... *G06F 1/1681* (2013.01); *E05D 3/122* (2013.01); *E05D 11/084* (2013.01); *G06F 1/1616* (2013.01); *E05Y 2999/00* (2024.05)

(58) Field of Classification Search
CPC .................................................. E05Y 2999/00
See application file for complete search history.

(56) References Cited

U.S. PATENT DOCUMENTS

| | | | |
|---|---|---|---|
| 8,615,848 B2 * | 12/2013 | Mitsui | G06F 1/1681 16/354 |
| 9,115,750 B2 | 8/2015 | Park | |

(Continued)

FOREIGN PATENT DOCUMENTS

| CN | 110825173 A | 2/2020 |
|---|---|---|
| CN | 111327739 A | 6/2020 |

(Continued)

OTHER PUBLICATIONS

The partial supplementary European search report for EP Application No. 21894957.6 mailed on Feb. 27, 2024.
The extended European search report for EP Application No. 21894957.6 mailed on Jun. 19, 2024.
International Search Report mailed Feb. 24, 2022 for PCT/KR2021/015705.

(Continued)

*Primary Examiner* — Lisa Lea-Edmonds
(74) *Attorney, Agent, or Firm* — CANTOR COLBURN LLP

(57) ABSTRACT

An electronic device has a hinge structure including a first fixed structure on which a first arc-shaped guide rail is formed, a second fixed structure on which a second arc-shaped guide rail is formed, a first rotating structure including a first coupling portion rotatably coupled to the first guide rail, a second rotating structure including a second coupling portion rotatably coupled to the second guide rail, and a torque structure which provides torque to the first rotating structure and the second rotating structure. The torque structure includes a cam structure formed on the first rotating structure and the second rotating structure, a cam member including a moving cam engaged with the cam structure, and an elastic member which is compressed or tensioned in response to linear movement of the cam member.

20 Claims, 18 Drawing Sheets

(56) References Cited

U.S. PATENT DOCUMENTS

| | | | |
|---|---|---|---|
| 9,714,533 B2* | 7/2017 | Kuramochi | E05D 3/12 |
| 9,921,613 B2* | 3/2018 | Kuramochi | G06F 1/1681 |
| 11,493,966 B2 | 11/2022 | Kim et al. | |
| 11,880,232 B2* | 1/2024 | Lee | G06F 1/1652 |
| 11,956,378 B2* | 4/2024 | Kang | G06F 1/1652 |
| 2012/0149438 A1* | 6/2012 | Kwon | H04M 1/022 |
| | | | 16/248 |
| 2012/0182677 A1 | 7/2012 | Seo | |
| 2015/0345195 A1 | 12/2015 | Park | |
| 2020/0267244 A1* | 8/2020 | Kim | G06F 1/1641 |
| 2020/0348732 A1 | 11/2020 | Kang et al. | |
| 2021/0240231 A1* | 8/2021 | Ku | G06F 1/1618 |
| 2021/0247815 A1* | 8/2021 | Shim | G06F 1/1641 |
| 2021/0392213 A1* | 12/2021 | Kim | H04M 1/022 |
| 2022/0159109 A1* | 5/2022 | Kang | G06F 1/1652 |
| 2022/0283612 A1* | 9/2022 | Kim | H05K 5/0226 |
| 2023/0213056 A1* | 7/2023 | Han | G06F 1/1656 |
| | | | 455/575.3 |
| 2023/0367363 A1* | 11/2023 | Lee | G06F 1/1681 |
| 2024/0259485 A1* | 8/2024 | Kang | G06F 1/1681 |

FOREIGN PATENT DOCUMENTS

| | | |
|---|---|---|
| CN | 113819139 A | 12/2021 |
| EP | 4191368 A1 | 6/2023 |
| KR | 200361984 Y1 | 9/2004 |
| KR | 101139866 B1 | 5/2012 |
| KR | 1020120083804 A | 7/2012 |
| KR | 1020130041098 A | 4/2013 |
| KR | 101747535 B1 | 6/2017 |
| KR | 1020190064939 A | 6/2019 |
| KR | 1020190124110 A | 11/2019 |
| KR | 102074867 B1 | 3/2020 |
| KR | 1020200101251 A | 8/2020 |
| WO | 2020076291 A1 | 4/2020 |
| WO | 2021091331 A1 | 5/2021 |

OTHER PUBLICATIONS

Korean Office Action for KR Application No. 10-2020-0154757 mailed on Feb. 4, 2025, citing the above reference(s).

* cited by examiner

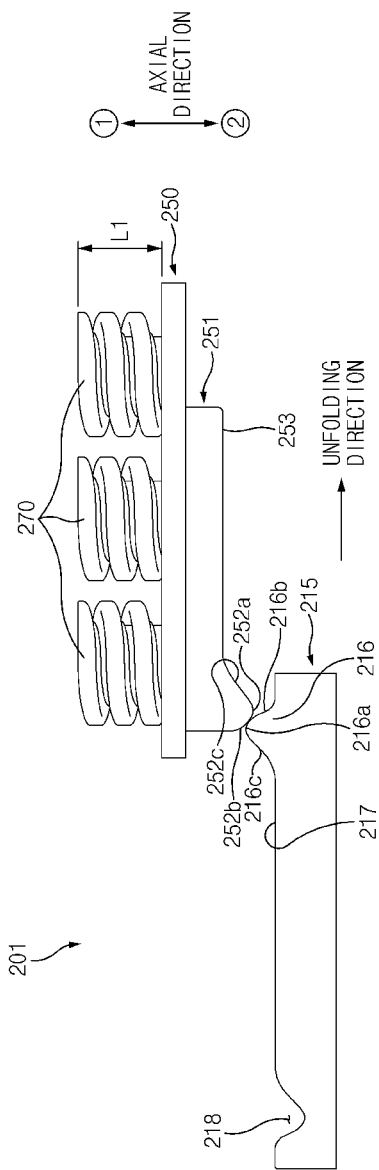
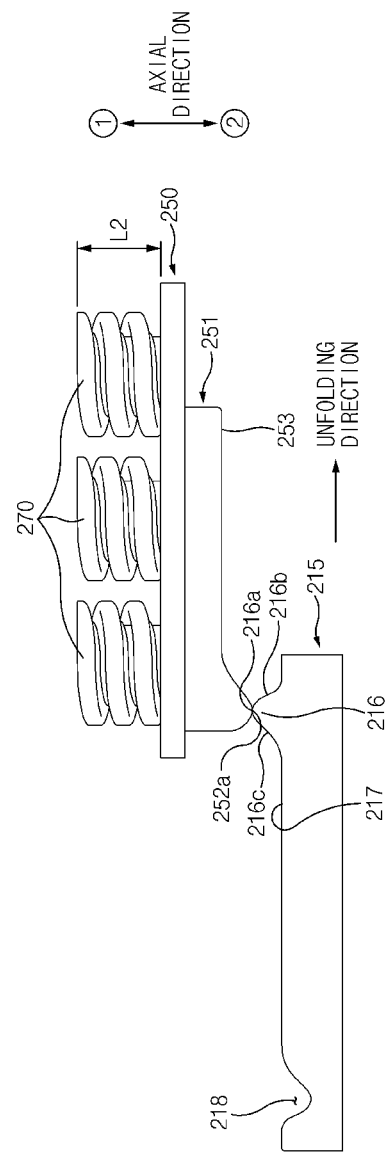
FIG. 10A
FIG. 10B

ELECTRONIC DEVICE HAVING TORQUE STRUCTURE

This application is a continuation application of International Patent Application No. PCT/KR2021/015705, filed on Nov. 2, 2021, claiming priority to Korean Patent Application No. 10-2020-0154757, filed on Nov. 18, 2020, the content of which in its entirety is herein incorporated by reference.

BACKGROUND

1. Field

Embodiments disclosed in the disclosure relate to an electronic device including a torque structure.

2. Description of the Related Art

A portable electronic device, such as a smartphone, may provide various functions, such as voice communication, playback of videos, and search through the internet, based on various kinds of applications. A user may intend to use the above-mentioned functions through a wider screen. However, as the screen of the portable electronic device becomes larger, portability may deteriorate. Accordingly, a foldable electronic device including a flexible display, a partial area of which is deformed to a curved surface or a flat surface, is being developed. The foldable electronic device may include a hinge structure to fold or unfold the flexible display.

The hinge structure of the foldable electronic device may be connected to adjacent housings such that the adjacent housings are rotated at predetermined angles. As the adjacent housings are rotated, the flexible display may be unfolded or folded.

SUMMARY

The curved area of the display in the folded state may have characteristics of being deformed to a flat surface. Due to the characteristics, a restoring torque in the unfolding direction may be applied to the foldable electronic device in the folded state. The restoring torque may be applied most strongly in a state, in which the electronic device is in a fully folded state.

Embodiments disclosed in the disclosure provide a hinge structure including a torque structure that provides a frictional torque such that an arbitrary folded state is stably maintained in correspondence to a restoring torque of a display, and an electronic device including the same.

An electronic device in embodiments disclosed in the disclosure includes a first housing, a second housing, and a hinge structure connected to the first housing and the second housing such that the first housing and the second housing are rotatable.

The hinge structure includes a first fixed structure having an arc-shaped first guide rail, a center of which is a first rotation axis R1 that is parallel to an axial direction, a first rotatable structure including a first coupling part coupled to the first guide rail to be rotatable and a first extending part connected to the first housing. The first rotatable structure rotated about the first rotation axis R1 together with the first housing, a first torque structure that provides a torque to the first rotatable structure. The first torque structure includes a first cam structure formed in the first coupling part, a first cam member including a first moving cam engaged with the first cam structure, and a first elastic member disposed between the first cam member and a first side wall of the first fixed structure and that is compressed or prolonged in correspondence to linear movement of the first cam member, a second fixed structure having an arc-shaped second guide rail, a center of which is a second rotation axis R2 that is parallel to the axial direction, a second rotatable structure including a second coupling part coupled to the second guide rail to be rotatable and a second extending part connected to the second housing. The second rotatable structure be rotated about the second rotation axis R2 together with the second housing, and a first torque structure that provides a torque to the second rotatable structure. The second torque structure includes a second cam structure formed in the second coupling part, a second cam member including a second moving cam engaged with the second cam structure, and a second elastic member disposed between the second cam member and a fourth side wall of the second fixed structure and that is compressed or prolonged in correspondence to linear movement of the second cam member.

An electronic device in embodiments disclosed in the disclosure includes a first housing and a second housing, a display disposed in the first housing and the second housing. The display includes a folding area that may be deformed to a curved surface or a flat surface, and a hinge structure connecting the first housing and the second housing such that the first housing and the second housing are rotatable whereby the first housing and the second housing define a predetermined included angle "A".

The hinge structure includes a first rotatable structure that is rotated about a first rotation axis R1 together with the first housing, a first elastic member that is compressed and prolonged through rotation of the first rotatable structure, a second rotatable structure that is rotated about a second rotation axis R2 together with the second housing, and a second elastic member that is compressed or prolonged through rotation of the second rotatable structure, The hinge structure includes a folded detent section defined from a fully folded state Sf to a first state S1, in which the included angle "A" is a first included angle A1. The first elastic member and the second elastic member are compressed by a first displacement ΔL1 as the included angle "A" increases in the folded detect section, and a free-stop section defined from a second state S2, in which the included angle "A" is a second included angle A2 that is larger than the first included angle A1, to a third state S3, in which the included angle "A" is a third included angle A3 that is larger than the second included angle A2. The first elastic member and the second elastic member has a predetermined compression state in the free-stop section regardless of the included angle, and the first elastic member and the second elastic member are in a compressed state such that a first frictional torque Tf1 that is higher than a restoring torque of the display is formed in the fully folded state Sf.

The hinge structure in the embodiments disclosed in the disclosure may include a torque structure that provides a frictional torque that may offset a restoring torque of the display. Furthermore, the hinge structure may provide a folding detent function, an unfolding detent function, and a free-stop function according to a folding angle of the electronic device. Furthermore, because the hinge structure may provide a frictional torque that is higher than a restoring torque of the display, a separate member (e.g., a magnet) for maintaining the fully folded state may be omitted.

In addition, the disclosure may provide various effects that are directly or indirectly recognized.

BRIEF DESCRIPTION OF DRAWINGS

The above and other exemplary embodiments, advantages and features of this disclosure will become more apparent by describing in further detail exemplary embodiments thereof with reference to the accompanying drawings, in which:

FIGS. 10A, 10B, 10C and 10D are views illustrating an embodiment of an operation of a first torque structure of a hinge structure.

With regard to description of drawings, the same or similar components may be marked by the same or similar reference numerals.

DETAILED DESCRIPTION

Hereinafter, various embodiments of the disclosure will be described with reference to the accompanying drawings. Accordingly, those of ordinary skill in the art will recognize that modification, equivalent, and/or alternative on the various embodiments described herein can be variously made without departing from the scope and spirit of the disclosure.

Figure 1:
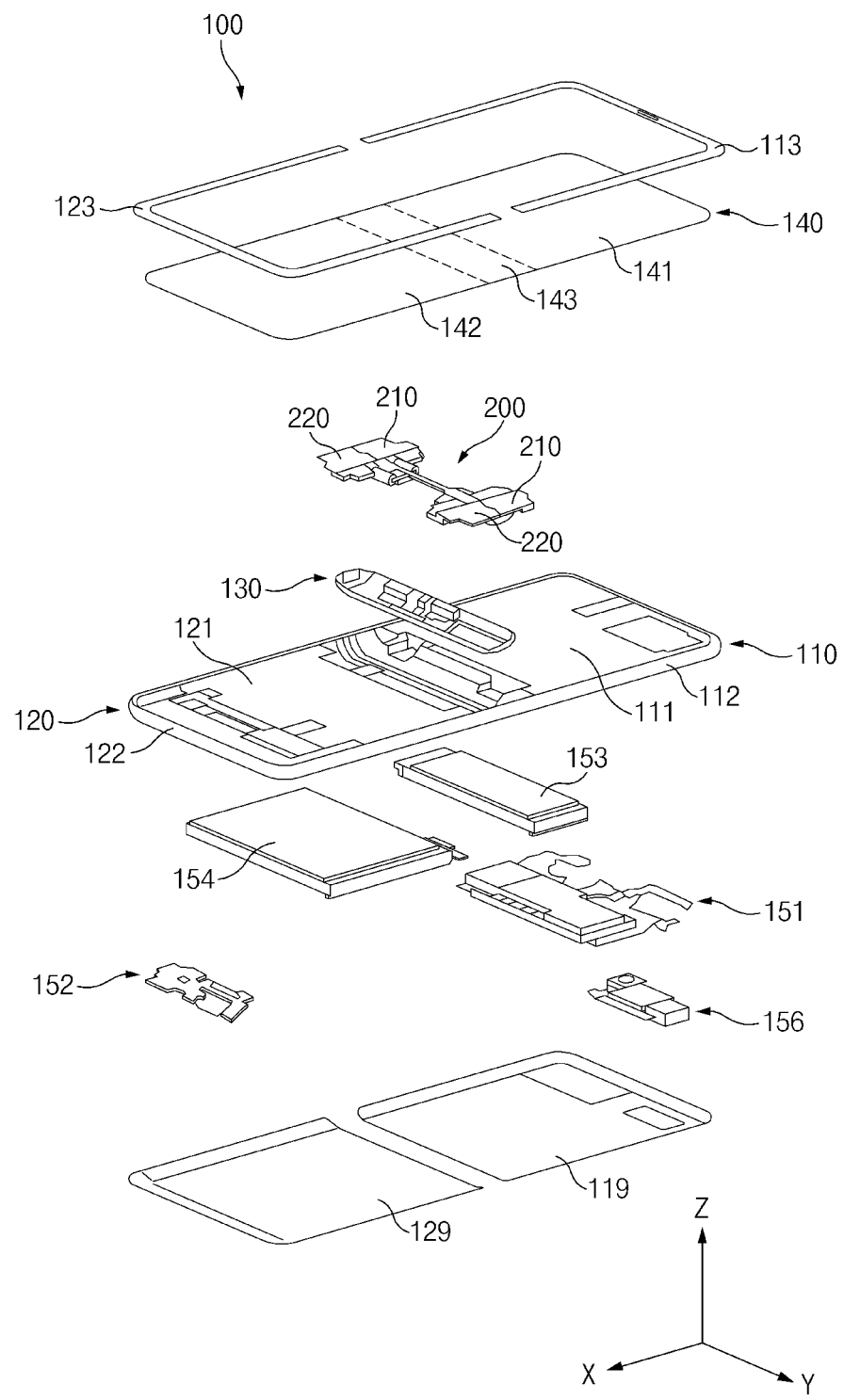
FIG. 1 is a view illustrating an exploded perspective view of an embodiment of an electronic device.

FIG. 1 is a view illustrating an exploded perspective view of an embodiment of an electronic device.

Referring to FIG. 1, an electronic device 100 may include a first housing 110, a second housing 120, a hinge housing 130, a hinge structure 200, and a display (e.g., a display panel or a display module) 140.

In an embodiment, the first housing 110 may be connected to the second housing 120 by the hinge structure 200. The first housing 110 may include a first plate 111, on which the display 140 is seated, and a first frame 112 that surrounds at least a portion of the first plate 111. In an embodiment, the first frame 112 may define a portion of a surface (e.g., a side surface) of the electronic device 100. In an embodiment, at least a portion of a first area 141 of the display 140 and at least a portion of a folding area 143 of the display 140 may be disposed in the first plate 111, for example. A first rotatable structure 210 of the hinge structure 200 may be connected to the first plate 111. In an embodiment, at least a portion of the first housing 110 may be bonded to the first area 141 of the display 140. Furthermore, at least a portion of a periphery of the front surface of the first housing 110 may be bonded to a periphery of the first area 141 of the display 140. In this regard, a bonding layer may be disposed between the first plate 111 of the first housing 110 and the first area 141 of the display 140.

In an embodiment, at least a portion of an inside of the first housing 110 may have a hollow shape. A first printed circuit board (also referred to as a first circuit board) 151, a first battery 153, and a camera module 156 may be disposed in an interior of the first housing 110. The first circuit board 151 and the first battery 153 may be electrically connected to a second circuit board 162 and a second battery 154 disposed in an interior of the second housing 120, through a flexible board. In an embodiment, a processor and a memory may be disposed in the first circuit board 161, for example. In an embodiment, the first battery 153 and the first circuit board 151 may be disposed in the first plate 111, for example. In an embodiment, the first housing 110 may be configured such that at least a portion thereof includes or consists of a metallic material or at least a portion thereof includes or consists of a nonmetallic material, for example. In an embodiment, the first housing 110 may include or consist of a material having a predetermined strength to support at least a portion of the display 140. In an embodiment, a portion of the first housing 110, which faces the second housing 120, may include a recessed part, at least a portion of which has a predetermined curvature such that the hinge housing 130 is disposed therein, for example.

In various embodiments, the first housing 110 may include a first decoration member 113 that surrounds a periphery of the display 140, and a first rear cover 119 that defines a surface of the electronic device 100 while facing the first plate 111. In an embodiment, the first decoration member 113 may cover a peripheral portion of the first area 141 and a periphery of a portion of the folding area 143 of the display 140, for example. In an embodiment, the first rear cover 119 may define a rear surface of the electronic device 100 in an unfolded state (e.g., FIG. 2A), and the display 140 may define a front surface of the electronic device, for example.

In an embodiment, the second housing 120 may be connected to the first housing 110 through the hinge structure 200. The second housing 120 may include a second plate 121, on which the display 140 is seated, and a second frame 122 that surrounds at least a portion of the second plate 121. In an embodiment, the second frame 122 may define a portion of a surface (e.g., a side surface) of the electronic device 100, for example. In an embodiment, at least a portion of the second area 142 and at least a portion of the folding area 143 may be disposed in the second plate 121, for example. A second rotatable structure 220 of the hinge structure 200 may be connected to the second plate 121. In an embodiment, at least a portion of the second housing 120 may be bonded to the second area 142 of the display 140. Furthermore, at least a portion of a periphery of the front surface of the second housing 120 may be bonded to a periphery of the second area 142 of the display 140. In this regard, a bonding layer may be disposed between the second plate 121 of the second housing 120 and the second area 142 of the display 140.

In an embodiment, at least a portion of an inside of the second housing 120 may have a hollow shape. A second circuit board 152 and a second battery 154 may be disposed in an interior of the second housing 120. The second circuit board 152 and the second battery 154 may be electrically connected to a first circuit board 151 and/or a first battery 153 disposed in an interior of the first housing 110, through a flexible board. In an embodiment, the second battery 154 and the second circuit board 152 may be disposed in the second plate 121, for example. In an embodiment, the second housing 120 may be configured such that at least a portion thereof includes or consists of a metallic material or at least a portion thereof includes or consists of a nonmetallic material. The second housing 120 may include or consist of a material having a predetermined strength to support at least a portion of the display 140. In an embodiment, a portion of the second housing 120, which faces the first housing 110, may include a recessed part, at least a portion of which has a predetermined curvature such that the hinge housing 130 is disposed therein.

In various embodiments, the second housing 120 may include a second decoration member 123 that surrounds a periphery of the display 140, and a second rear cover 129 that defines a surface of the electronic device 100 while facing the second plate 121. In an embodiment, the second decoration member 123 may cover a peripheral portion of the second area 142 and a periphery of a portion of the folding area 143 of the display 140, for example. In an embodiment, the second rear cover 129 may define a rear surface of the electronic device 100 in an unfolded state (e.g., FIG. 2A), and the display 140 may define a front surface of the electronic device, for example.

In various embodiments, a lattice structure (not illustrated) and/or a bracket (not illustrated) disposed between the display 140 and the bonding layer may be further included. The lattice structure may include a slit area including a plurality of slits that at least partially overlap the folding area 143. The plurality of slits may extend long in an extension direction (e.g., the y axis) of the folding area 143, respectively. The plurality of slits may support the folding area 143 that is a flat surface in the unfolded state (e.g., FIG. 2A), and may help the folding area 143 to be deformed in a folding operation or an unfolding operation. In various embodiments, a portion of the lattice structure or the bracket may be stacked on the display 140.

In an embodiment, the hinge housing 130 may be disposed in the recessed parts of the first housing 110 and the second housing 120. The hinge housing 130 may have a shape that extends long in the y axis direction as a whole. A boss for fixing the hinge structure 200 may be disposed in a partial area of an inner surface of the hinge housing 130.

In an embodiment, at least a portion of the display 140 may be flexible. In an embodiment, the display 140 may include a first area 141 disposed on the first housing 110, a second area 142 disposed on the second housing 120, and a folding area 143 disposed between the first area 141 and the second area 142, for example. In an embodiment, the first area 141 and the second area 142 may be substantially flat, and the folding area 143 may be deformed to a flat surface or a curved surface.

In various embodiments, the hinge structure 200 may include a first rotatable structure 210 connected to the first housing 110, and a second rotatable structure 220 connected to the second housing 120. The hinge structure 200 may be configured such that the first rotatable structure 210 and the second rotatable structure 220 is rotatable about rotation axes (e.g., imaginary axes that are parallel to the y axis direction) thereof. In an embodiment, when the first housing 110 and the second housing 120 are folded or unfolded, the first rotatable structure 210 and the second rotatable structure 220 may be rotated about the rotation axes thereof, for example.

Figure 2A:
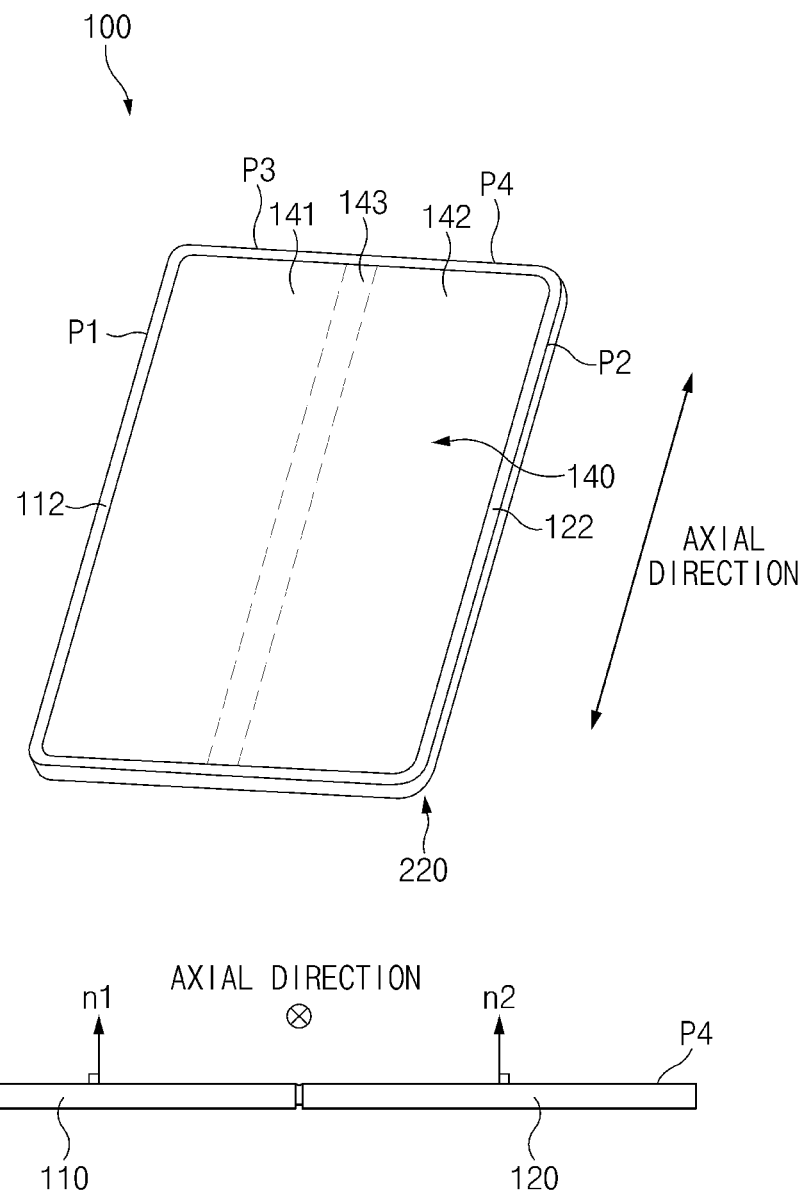
FIG. 2A is a view illustrating an embodiment of an unfolded state of an electronic device.
Figure 2B:
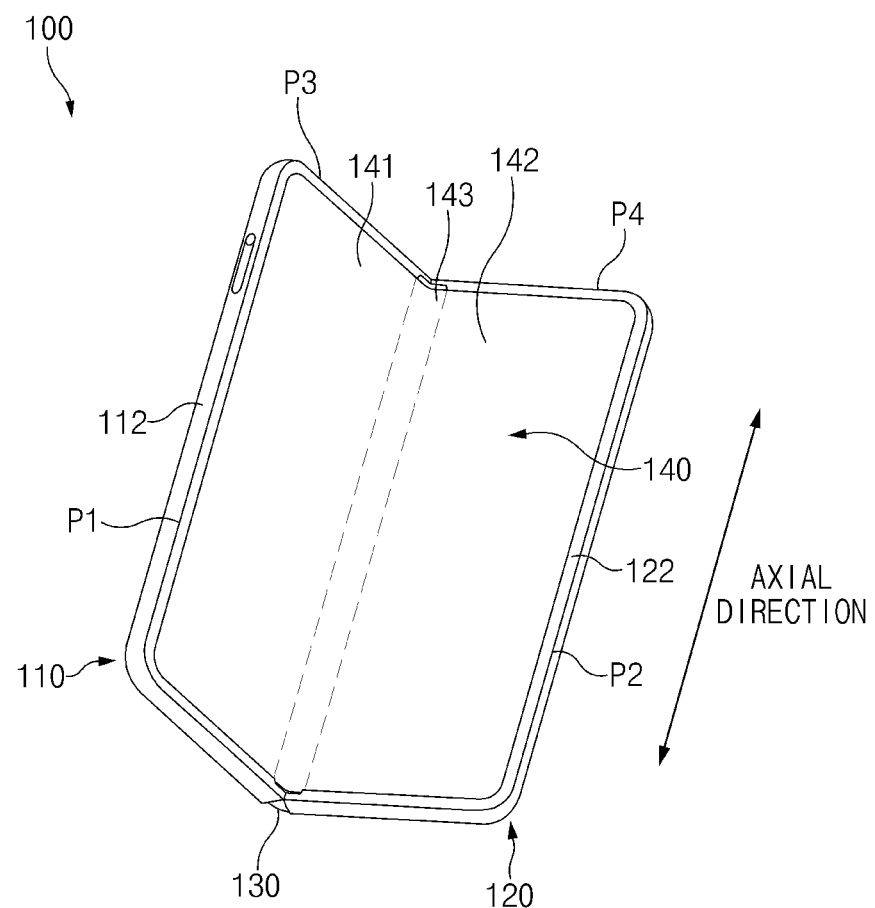
FIG. 2B is a view illustrating an embodiment of a folded state of an electronic device.
Figure 2B:
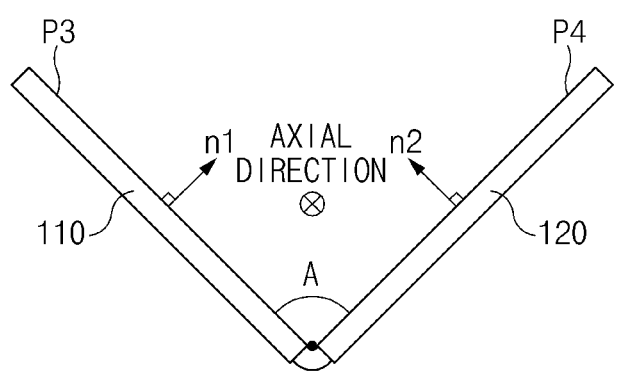
Figure 2C:
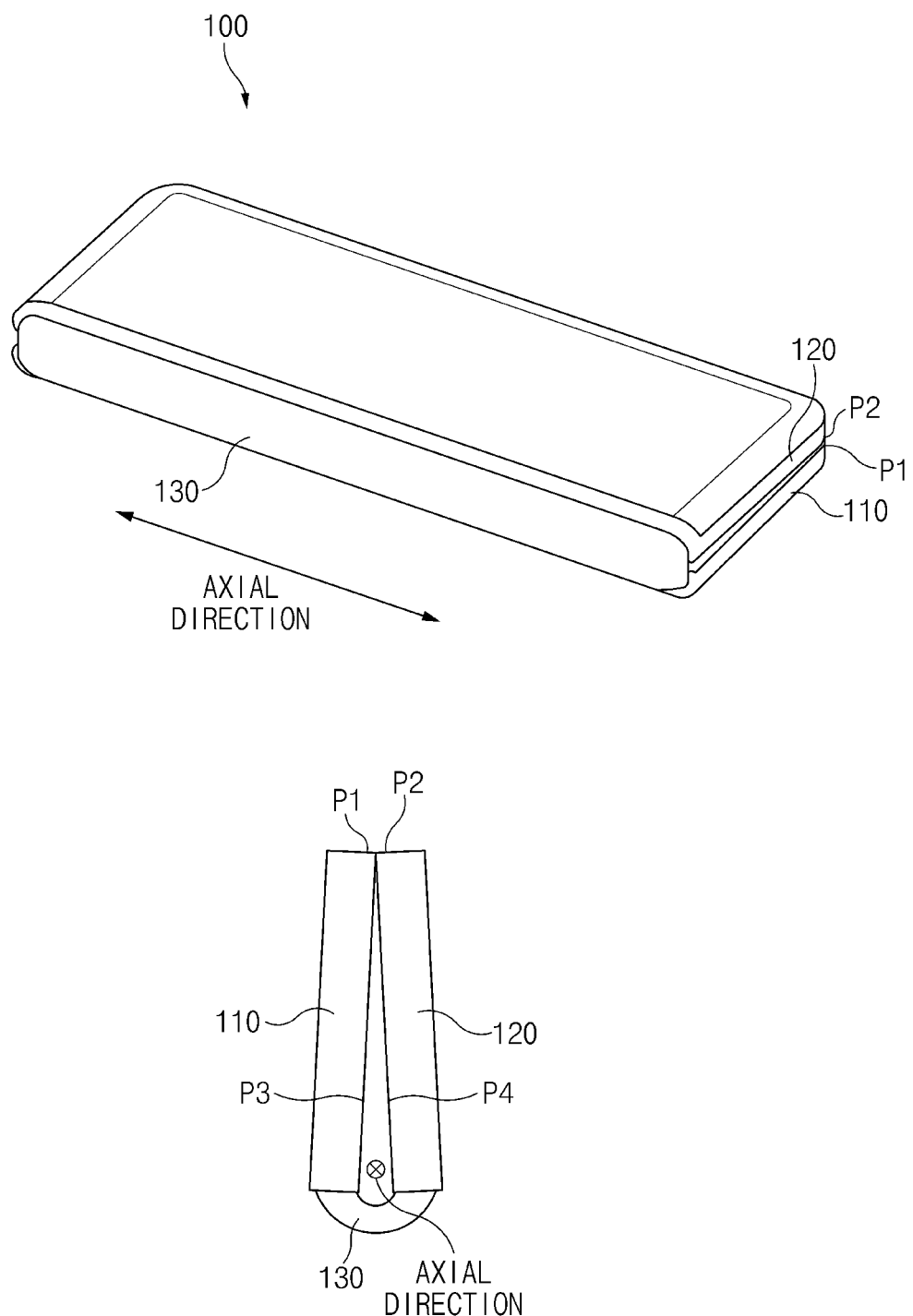
FIG. 2C is a view illustrating an embodiment of a fully folded state of an electronic device.

FIG. 2A is a view illustrating an embodiment of the unfolded state of the electronic device. FIG. 2B is a view illustrating an embodiment of the folded state of the electronic device. FIG. 2C is a view illustrating an embodiment of the fully folded state of the electronic device.

In an embodiment, the first housing 110 and the second housing 120 may be rotated in opposite directions about the rotation axes R1 and R2 (refer to FIG. 3) thereof, respectively. In an embodiment, in a folding operation from the unfolded state, the first housing 110 may be rotated in the counterclockwise direction ccw, and the second housing 120 may be rotated in the clockwise direction cw (refer to FIGS. 7A and 7B), for example.

In an embodiment, an axial direction that is parallel to the rotation axis of the first housing 110 and the second housing 120 may be defined. The axial direction may be defined as an extension direction of the folding area 143 of the display 140. In an embodiment, the axial direction may be defined as a long side direction of the folding area 143, for example. In an embodiment, the axial direction may mean a direction that is parallel to the y axis of FIG. 1, for example.

To describe the states of the electronic device 100, a first periphery P1 of the electronic device 100 and a second periphery P2 of the electronic device 100 that are perpendicular to the axial direction may be defined. To describe the states of the electronic device 100, a third periphery P3 of the electronic device 100 and a fourth periphery P4 of the electronic device 100 that are perpendicular to the axial direction may be defined. In an embodiment, the first periphery P1 and the third periphery P3 may include a portion of the first frame 112 of the first housing 110, for example. In an embodiment, the second periphery P2 and the fourth periphery P4 may include a portion of the second frame 122 of the second housing 120, for example.

The unfolded state of the electronic device will be described with reference to FIG. 2A.

In an embodiment, the unfolded state may include a state, in which the folding area 143 of the display 140 is flat, for example. In an embodiment, an unfolded state may include a state, in which the first area 141 and the second area 142 of the display 140 are flat surfaces that face the same direction, for example. In an embodiment, the unfolded state may include a state, in which a first normal vector n1 of the first area 141 of the display 140 and a second normal vector n2 of the second area 142 are parallel to each other, for example. In an embodiment, the unfolded state may include a state, in which the third periphery P3 and the fourth periphery P4 form one substantially straight line, for example. In an embodiment, the unfolded state may include a state, in which the third periphery P3 and the fourth periphery P4 form 180 degrees, for example.

The folded state of the electronic device will be described with reference to FIG. 2B.

In an embodiment, the folded state may include a state, in which the folding area 143 of the display 140 is curved, for example. In an embodiment, the folded state may include a state, in which the first normal vector n1 of the first area 141 and the second normal vector n2 of the second area 142 form a predetermined angle other than 180 degrees, for example. In an embodiment, the folded state may include a state, in which the third periphery P3 and the fourth periphery P4 form the predetermined angle other than 180 degrees, for example.

The fully folded state of the electronic device will be described with reference to FIG. 2C.

In an embodiment, the fully folded state may mean a state of the folded state, in which the first periphery P1 and the second periphery P2 substantially contact each other, for example. In an embodiment, the folding area 143 in the fully folded state may include a curved surface having a curvature that is larger than that of the folding area 143 in the folded state, for example.

Referring to FIGS. 2B and 2C, in the folded state and the fully folded state, at least a portion of the hinge housing 130 may define a surface of the electronic device 100. In an embodiment, the hinge housing 130 may be visually exposed through a space between the first housing 110 and the second housing 120, for example.

Figure 3:
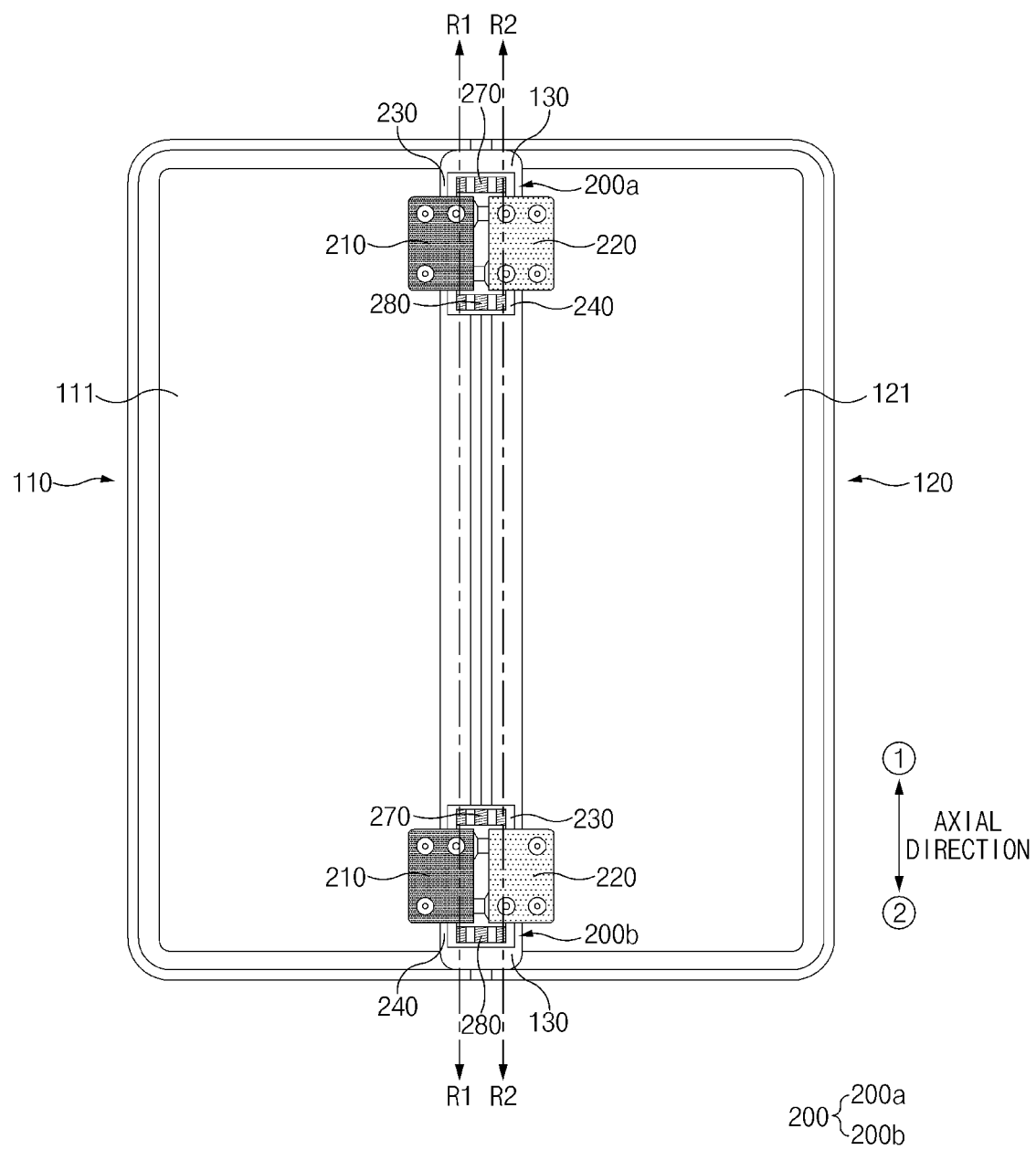
FIG. 3 is a view illustrating an embodiment of a hinge structure and a housing of an electronic device.

FIG. 3 is a view illustrating an embodiment of the hinge structure and the housing of the electronic device.

In an embodiment, the electronic device 100 may include one or more hinge structures 200. The hinge structure 200 may connect the first housing 110 and the second housing 120 such that the first housing 110 and the second housing 120 may be rotated about the first rotation axis R1 and the second rotation axis R2, respectively. In an embodiment, the electronic device 100 may include a plurality of hinge structures 200. The plurality of hinge structures 200 may include a first hinge structure 200a, and a second hinge structure 200b that is spaced apart from the first hinge structure 200a in the axial direction.

In an embodiment, the hinge structure 200 may include fixed structures 230 and 240 that are fixedly disposed in the hinge housing 130, the first rotatable structure 210 that is connected to the first housing 110, and the second rotatable structure 220 that is connected to the second housing 120.

In an embodiment, the fixed structures 230 and 240 may include a first fixed structure 230 and a second fixed structure 240. In an embodiment, the first elastic member 270 may be coupled to the first fixed structure 230 such that the first rotatable structure 210 is rotatable. In an embodiment, the second elastic member 280 may be disposed in the second fixed structure 240, and the second rotatable structure 220 may be coupled thereto to be rotatable, for example.

In various embodiments, the fixed structures 230 and 240 may include one fixed structure, in which the first fixed structure 230 and the second fixed structure 240, which are coupled to each other to be separable, are included, are unitary, or are coupled to each other.

In an embodiment, the first rotatable structure 210 may be connected to the first plate 111 of the first housing 110. In an embodiment, when the electronic device 100 is folded or unfolded, the first rotatable structure 210 may be rotated about the first rotation axis R1 together with the first housing 110, for example.

In an embodiment, the second rotatable structure 220 may be connected to the second plate 121 of the second housing 120. In an embodiment, when the electronic device 100 is folded or unfolded, the second rotatable structure 220 may be rotated about the second rotation axis R2 together with the second housing 120, for example.

In an embodiment, the hinge structure 200 may further include a first torque structure including the first elastic member 270 and a second torque structure including the second elastic member 280.

In an embodiment, the first torque structure may provide a torque that is applied to the first rotatable structure 210. In an embodiment, the first torque structure may provide a torque that is applied about the first rotation axis R1, for example. The first elastic member 270 may be disposed in the first fixed structure 230, and may interlock with rotation of the first rotatable structure 210 to be compressed or prolonged. In an embodiment, when the first elastic member 270 is compressed relatively further, a higher torque may be applied to the first rotatable structure 210, for example.

In an embodiment, the second torque structure may provide a torque that is applied to the second rotatable structure 220. In an embodiment, the second torque structure may provide a torque that is applied about the second rotation axis R2, for example. The second elastic member 280 may be disposed in the second fixed structure 240, and may interlock with rotation of the second rotatable structure 220 to be compressed or prolonged. In an embodiment, when the second elastic member 280 is compressed relatively further, a higher torque may be applied to the second rotatable structure 220, for example.

Figure 4:
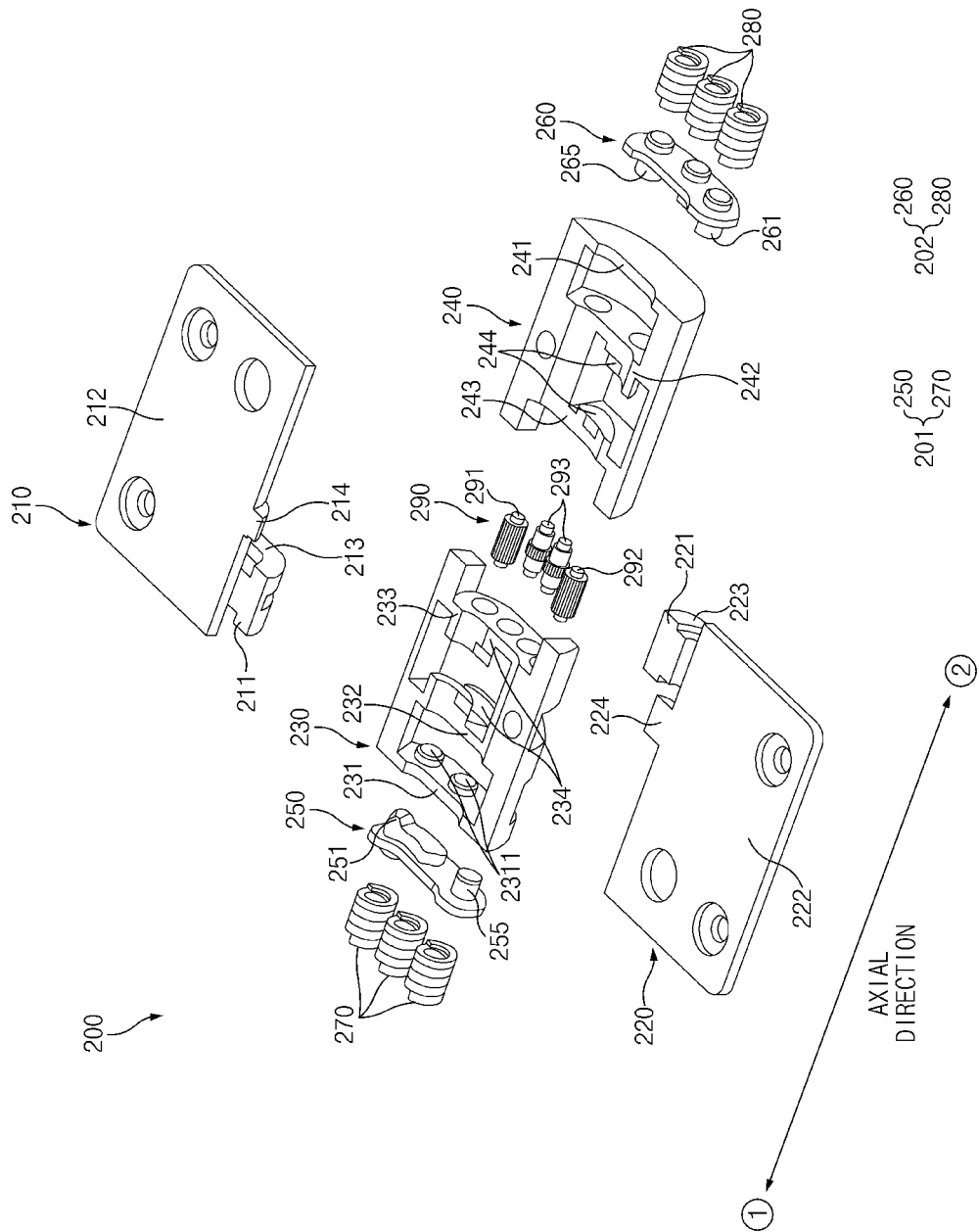
FIG. 4 is an exploded perspective view illustrating an embodiment of the hinge structure.
Figure 5A:
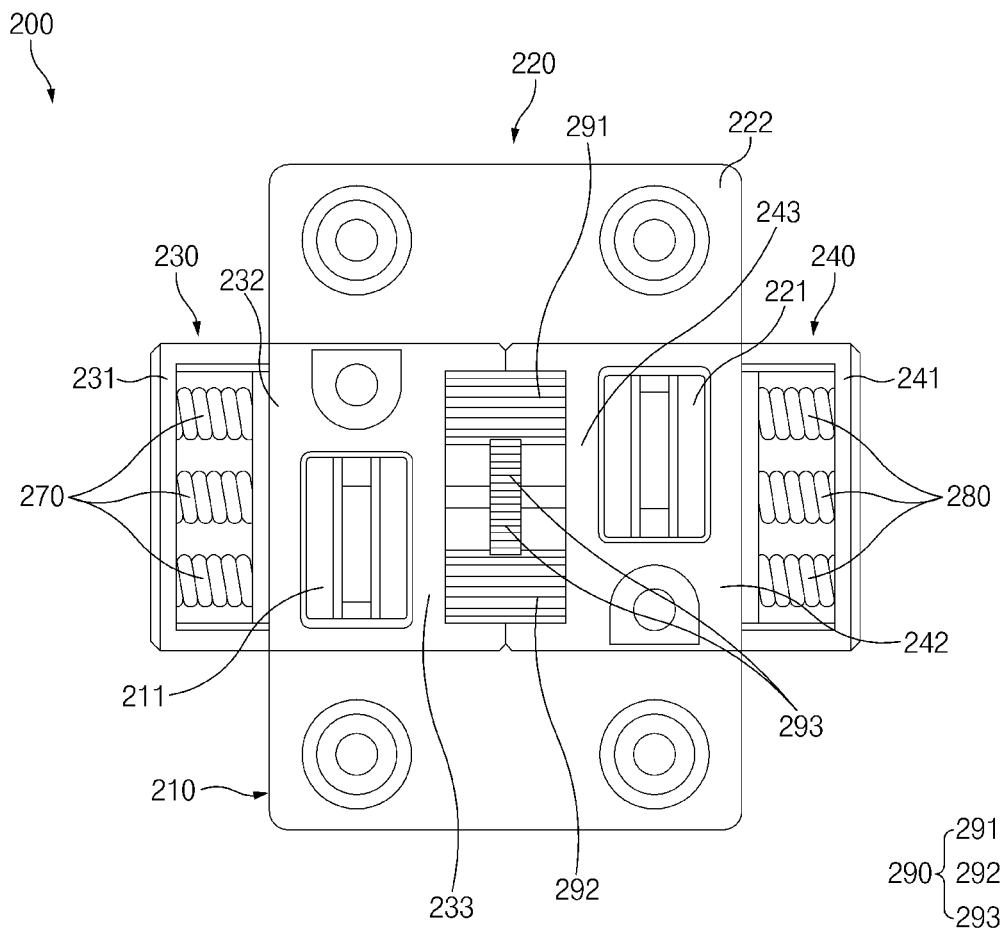
FIG. 5A and FIG. 5B are views illustrating an embodiment of an unfolded state and a fully folded state of a hinge structure.
Figure 5B:
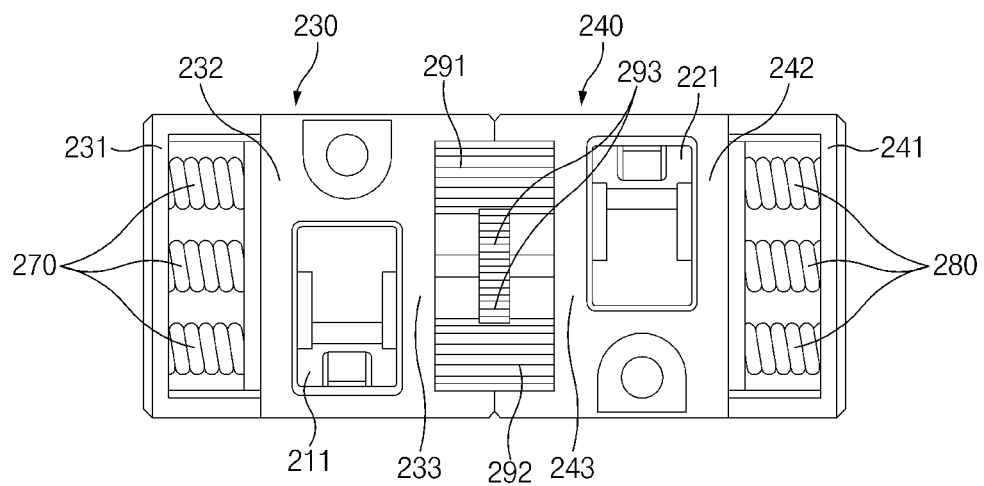

FIG. 4 is an exploded perspective view illustrating an embodiment of the hinge structure. FIGS. 5A and 5B are views illustrating an embodiment of the unfolded state and the fully folded state of the hinge structure.

The axial direction may be defined in the hinge structure 200. The axial direction may be a direction that is parallel to extension directions of the first rotation axis R1 and the second rotation axis R2. In an embodiment, a first axial direction (①) may be a direction that faces the first fixed structure 230, and a second axial direction (②) may be a direction that faces the second fixed structure 240, for example.

In an embodiment, the hinge structure 200 may include the first fixed structure 230, the second fixed structure 240, a gear structure 290, the first rotatable structure 210, the second rotatable structure 220, a first torque structure 201, and a second torque structure 202.

In an embodiment, at least portions of the first fixed structure 230 and the second fixed structure 240 may be fixedly disposed in an interior of the hinge housing (e.g., the hinge housing 130 of FIG. 3). The first rotatable structure 210 may be coupled to the first fixed structure 230 to be rotatable about the first rotation axis R1. The second rotatable structure 220 may be coupled to the second fixed structure 240 to be rotatable about the second rotation axis R2.

In an embodiment, the gear structure 290 may be disposed between the first fixed structure 230 and the second fixed structure 240. The gear structure 290 may include an even number of connection gears. In an embodiment, the first connection gear 291 may be connected to a first gear part 214 of the first rotatable structure 210, for example. In an embodiment, teeth of the first connection gear 291 may engaged with teeth of the first gear part 214, for example. In an embodiment, the second connection gear 292 may be connected to a second gear part 224 of the second rotatable structure 220, for example. In an embodiment, teeth of the second connection gear 292 may engaged with teeth of the second gear part 224, for example. Third connection gears 293 may connect the first connection gear 291 and the second connection gear 292. The third connection gears 293 may include an even number of gears such that the first connection gear 291 and the second connection gear 292 are rotated in opposite directions. Accordingly, the first rotatable structure 210 and the second rotatable structure 220 may interlock with each other to be rotated at the same angle in opposite directions.

In an embodiment, the first fixed structure 230 may include a first side wall 231, a second side wall 232, and a third side wall 233. In an embodiment, the first side wall 231 and the second side wall 232 may face each other. The first side wall 231 may be disposed in the first axial direction (①) from the second side wall 232. The first elastic member 270 and the first cam member 250 may be disposed between the first side wall 231 and the second side wall 232. In an embodiment, a first fixing part 2311 for fixing the first elastic member 270 may be formed on the first side wall 231, for example. The first fixing part 2311 may protrude in the second axial direction (②) The number of first fixed parts 2311 may correspond to the number of the first elastic members 270. In an embodiment, the first fixing parts 2311 may constrain the first elastic member 270 in the axial direction such that the first elastic member 270 is compressed or prolonged in the axial direction between the first side wall 231 and the second side wall 232. In an embodiment, the second side wall 232 and the third side wall 233 may face each other, for example. The second side wall 232 may be disposed in the first axial direction (①) from the third side wall 233. The second side wall 232 is disposed between the first side wall 231 and the third side wall 233. A first coupling structure 211 of the first rotatable structure 210 may be disposed between the second side wall 232 and the third side wall 233. In an embodiment, a first guide rail 234, to which a first guide portion 213 of the first rotatable structure 210 is coupled, may be formed in the second side wall 232 and/or the third side wall 233, for example. The first guide rail 234, as will be described below, may include an arc-shaped rail corresponding to a path, in which the first rotatable structure 210 is rotated. In an embodiment, the third side wall 233 may face a sixth side wall 243 of the second fixed structure 240. Connection gears 291, 292, and 293 may be disposed between the third side wall 233 and the sixth side wall 243 of the second fixed structure 240. In an embodiment, an opening and/or a recess, into which the rotation axes of the connection gears 291, 292, and 293 are inserted, may be formed in the third side wall 233, for example.

In an embodiment, the first rotatable structure 210 may be rotated in a predetermined path with respect to the first fixed structure 230 fixedly disposed in the hinge housing (e.g. the hinge housing 130 of FIG. 1) when the first housing (e.g., the first housing 110 of FIG. 1) is folded or unfolded. In an embodiment, the first rotatable structure 210 may include the first coupling structure 211 coupled to the first fixed structure 230 to be rotatable, and a first extending part 212 connected to the first housing 110. The first extending part 212 may be rotated together with the first housing 110 when the electronic device 100 is folded or unfolded. In an embodiment, the first coupling structure 211 may be disposed such that at least a portion thereof is disposed between the second side wall 232 and the third side wall 233 of the first fixed structure 230. In an embodiment, the first coupling structure 211 may include the first guide portion 213, and a first cam structure (e.g., a first cam structure 215 of FIG. 8A). In an embodiment, the first guide portion 213 may be coupled to the first guide rail 234 of the first fixed structure 230. In an embodiment, the first guide portion 213 may be at least partially accommodated in the first guide rail 234, for example. The first guide portion 213 may include a portion that protrudes in the axial direction. In an embodiment, the first guide portion 213 may include a portion that protrudes toward the second side wall 232 and/or the third side wall 233, for example. In an embodiment, the first cam structure 215 may be engaged with a first moving cam 251 of the first cam member 250. In an embodiment, any one of the first cam structure 215 or the first moving cam 251 may pass through an opening defined in the second side wall 232 and may be connected to the other, for example. In an embodiment, the first cam structure 215 and the first moving cam 251 may at least partially contact each other, for example. In an embodiment, a first protruding part (e.g., a first protruding part 252 of FIG. 9) of the first moving cam 251 may extend between the second side wall 232 and the third side wall 233 through the opening defined in the second side wall 232 and may be engaged with the first cam structure 215, for example.

In an embodiment, the first torque structure 201 may provide a torque to the first rotatable structure 210. In an embodiment, the first torque structure 201 may provide a torque that is applied about the first rotation axis R1, for example. The torque may be applied in a rotational direction of the first rotatable structure 210 or may be applied in an opposite direction to the rotational direction of the first rotatable structure 210. In an embodiment, the first torque structure 201 may include the first cam structure (e.g., the first cam structure 215 of FIG. 8A), the first elastic member 270, and the first cam member 250.

In an embodiment, the first cam member 250 may be disposed such that at least a portion thereof is disposed between the first side wall 231 and the second side wall 232 of the first fixed structure 230. The first cam member 250 may include the first moving cam 251 and a first linear movement guide part 255. The first moving cam 251 may include a first protruding part (e.g., the first protruding part 252 of FIG. 8B) that extends through the opening defined in the second side wall 232. The first protruding part 252 may be engaged with a third protruding part (e.g., a third protruding part 216 of FIG. 8A) included in the first cam structure 215 of the first rotatable structure 210.

In an embodiment, the first cam member 250 may be linearly moved in the axial direction according to an engagement state of the first moving cam 251 and the first cam structure (e.g., the first cam structure 215 of FIG. 7A) of the first rotatable structure 210. The first cam member 250 may further include the first linear movement guide part 255 that is coupled to the first fixed structure 230 to be linearly moved. In an embodiment, the first linear movement guide part 255 may include a protruding portion that extends long in the axial direction, for example. In an embodiment, at least a portion of the first linear movement guide part 255 may be accommodated in the recess or the opening defined in the second side wall 232, for example. In an embodiment, the first cam member 250 may be moved in the axial direction while the first linear movement guide part 255 is accommodated in the recess or the opening, for example. In an embodiment, the first linear movement guide part 255 may extend longer than a maximum axial movement distance of the first cam member, for example. In an embodiment, the first linear movement guide part 255 may be accommodated in the second side wall 232 even when the first cam member 250 is moved maximally in the first axial direction (①), for example.

In an embodiment, one side of the first elastic member 270 may be supported by the first side wall 231 of the first fixed structure 230, and an opposite side thereof may be supported by the first cam member 250. In an embodiment, the first elastic member 270 may be coupled to the first fixing part 2311 formed in the first side wall 231 of the first fixed structure 230, for example. The first elastic member 270 may be compressed or prolonged according to the axial movement of the first cam member 250. In an embodiment, the first elastic member 270 may be compressed when the first cam member 250 is moved in the first axial direction (①), and the first elastic member 270 may be prolonged when the first cam member 250 is moved in the second axial direction (②), for example. In an embodiment, the first elastic member 270 may press the first cam member 250 in the second axial direction (②). The pressing may increase a frictional force between the first moving cam 251 of the first cam member 250 and the first cam structure (e.g., the first cam structure 215 of FIG. 9) of the first rotatable structure 210. The increased frictional force may generate an increased torque in the first rotation axis R1. In an embodiment, the torque formed in the first rotation axis R1 may increase as the first elastic member 270 is compressed, for example. In an embodiment, the first elastic member 270 that is further compressed as the first cam member 250 is moved in the first axial direction (①), and accordingly, the frictional force between the first moving cam 251 and the first cam structure 215 may increase and the torque applied to the first rotation axis R1 may increase, for example. In various embodiments, a plurality of first elastic members 270 may be formed. In various embodiments, the first elastic member 270 may include a coil spring, at least a portion of which surrounds the first fixing part 2311 formed in the first side wall 231.

In an embodiment, the second fixed structure 240 may include a fourth side wall 241, a fifth side wall 242, and a sixth side wall 243. In an embodiment, the fourth side wall 241 and the fifth side wall 242 may face each other. The fourth side wall 241 may be disposed in the second axial direction (②) from the fifth side wall 242. The second elastic member 280 and the second cam member 260 may be disposed between the fourth side wall 241 and the fifth side wall 242. In an embodiment, a second fixing part (not illustrated) for fixing the second elastic member 280 may be formed on the fourth side wall 241, for example. The second fixing part may protrude in the first axial direction (①). The number of second fixed parts may correspond to the number of the second elastic members 280. In an embodiment, the fifth side wall 242 and the sixth side wall 243 may face each other. The fifth side wall 242 may be disposed in the second axial direction (②) from the sixth side wall 243. The fifth side wall 242 is disposed between the fourth side wall 241 and the sixth side wall 243. A second coupling structure 221 of the second rotatable structure 220 may be disposed between the fifth side wall 242 and the sixth side wall 243. In an embodiment, a second guide rail 244, to which a second guide portion 223 of the second rotatable structure 220 is coupled, may be formed in the fifth side wall 242 and/or the sixth side wall 243, for example. The second guide rail 244, as will be described below, may include an arc-shaped rail corresponding to a path, in which the second rotatable structure 220 is rotated. In an embodiment, the sixth side wall 243 may face the third side wall 233 of the first fixed structure 230. Connection gears 291, 292, and 293 may be disposed between the sixth side wall 243 and the third side wall 233 of the first fixed structure 230. In an embodiment, an opening and/or a recess, into which the rotation axes of the connection gears 291, 292, and 293 are inserted, may be formed in the sixth side wall 243, for example.

In an embodiment, the second rotatable structure 220 may be rotated in a predetermined path with respect to the second fixed structure 240 fixedly disposed in the hinge housing (e.g. the hinge housing 130 of FIG. 1) when the second housing (e.g., the second housing 120 of FIG. 2) is folded or unfolded. In an embodiment, the second rotatable structure 220 may include the second coupling structure 221 coupled to the second fixed structure 240 to be rotatable, and a second extending part 222 connected to the second housing 120. The second extending part 222 may be rotated together with the second housing 120 when the electronic device is folded or unfolded. In an embodiment, the second coupling structure 221 may be disposed such that at least a portion thereof is disposed between the fifth side wall 242 and the sixth side wall 243 of the second fixed structure 240. In an embodiment, the second coupling structure 221 may include the second guide portion 223, and a second cam structure (e.g., a second cam structure 225 of FIG. 7B). In an embodiment, the second guide portion 223 may be coupled to the second guide rail 244 of the second fixed structure 240. In an embodiment, the second guide portion 223 may be at least partially accommodated in the second guide rail 244, for example. The second guide portion 223 may include a portion that protrudes in the axial direction. In an embodiment, the second guide portion 223 may include a portion that protrudes toward the fifth side wall 242 and/or the sixth side wall 243, for example. In an embodiment, the second cam structure (e.g., the second cam structure 225 of FIG. 7B) may be engaged with a second moving cam 261 of the second cam member 260. In an embodiment, any one of the second cam structure 225 or the second moving cam 261 may pass through an opening defined in the fifth side wall 242 and may be connected to the other, for example. In an embodiment, the second cam structure 225 and the second moving cam 261 may at least partially contact each other, for example. In an embodiment, a second protruding part (e.g., a first protruding part 252 of FIG. 8B) of the second moving cam 251 may extend between the fifth side wall 242 and the sixth side wall 243 through the opening defined in the fifth side wall 242, for example.

In an embodiment, the second torque structure 202 may provide a torque to the second rotatable structure 220. In an embodiment, the second torque structure 202 may provide a torque that is applied about the second rotation axis R2, for example. The torque may be applied in a rotational direction of the second rotatable structure 220 or may be applied in an opposite direction to the rotational direction of the second rotatable structure 220. In an embodiment, the second torque structure 202 may include the second elastic member 280 and the second cam member 260.

In an embodiment, the second cam member 260 may be disposed such that at least a portion thereof is disposed between the fourth side wall 241 and the fifth side wall 242 of the second fixed structure 240. The second cam member 260 may include the second moving cam 261 and a second linear movement guide part 265. The second moving cam 261 may include a second protruding part (e.g., the second protruding part 252 of FIG. 8B) that extends through the opening defined in the fifth side wall 242. The second protruding part may be engaged with the second cam structure 225 of the second rotatable structure 220.

In an embodiment, the second cam member 260 may be linearly moved in the axial direction according to an engagement state of the second moving cam 261 and the second cam structure (e.g., the second cam structure 225 of FIG. 7B) of the second rotatable structure 220. The second cam member 260 may further include the second linear movement guide part 265 that is coupled to the second fixed structure 240 to be linearly moved. In an embodiment, the second linear movement guide part 265 may include a protruding portion that extends long in the axial direction, for example. In an embodiment, at least a portion of the second linear movement guide part 265 may be accommodated in the recess or the opening defined in the fifth side wall 242, for example. In an embodiment, the second cam member 260 may be moved in the axial direction while the second linear movement guide part 265 is accommodated in the recess or the opening, for example. In an embodiment, the second linear movement guide part 265 may extend longer than a maximum axial movement distance of the second cam member 260, for example. In an embodiment, the second linear movement guide part 265 may be accommodated in the fifth side wall 242 even when the second cam member 260 is moved maximally in the second axial direction ②, for example.

In an embodiment, one side of the second elastic member 280 may be supported by the fourth side wall 241 of the second fixed structure 240, and an opposite side thereof may be supported by the second cam member 260. In an embodiment, the second elastic member 280 may be coupled to the second fixing part (not illustrated) formed in the fourth side wall 241 of the second fixed structure 240, for example. The second elastic member 280 may be compressed or prolonged according to the axial movement of the second cam member 260. In an embodiment, the second elastic member 280 may be compressed when the second cam member 260 is moved in the second axial direction ②, and the second elastic member 280 may be prolonged when the second cam member 260 is moved in the first axial direction ①, for example. In an embodiment, the second elastic member 280 may press the second cam member 260 in the first axial direction ①. The pressing may increase a frictional force between the second moving cam 261 of the second cam member 260 and the second cam structure 225 of the second rotatable structure 220. The increased frictional force may generate an increased torque in the second rotation axis R2. In an embodiment, the torque formed in the second rotation axis R2 may increase as the second elastic member 280 is compressed, for example. In an embodiment, the second elastic member 280 that is further compressed as the second cam member 260 is moved in the second axial direction (②), and accordingly, the frictional force between the second moving cam 261 and the second cam structure 225 may increase and the torque applied to the second rotation axis R2 may increase, for example. In various embodiments, a plurality of second elastic members 280 may be formed. In various embodiments, the second elastic member 280 may include a coil spring, at least a portion of which surrounds the second fixing part (not illustrated) formed in the fourth side wall 241.

Figures 6A, 6B:
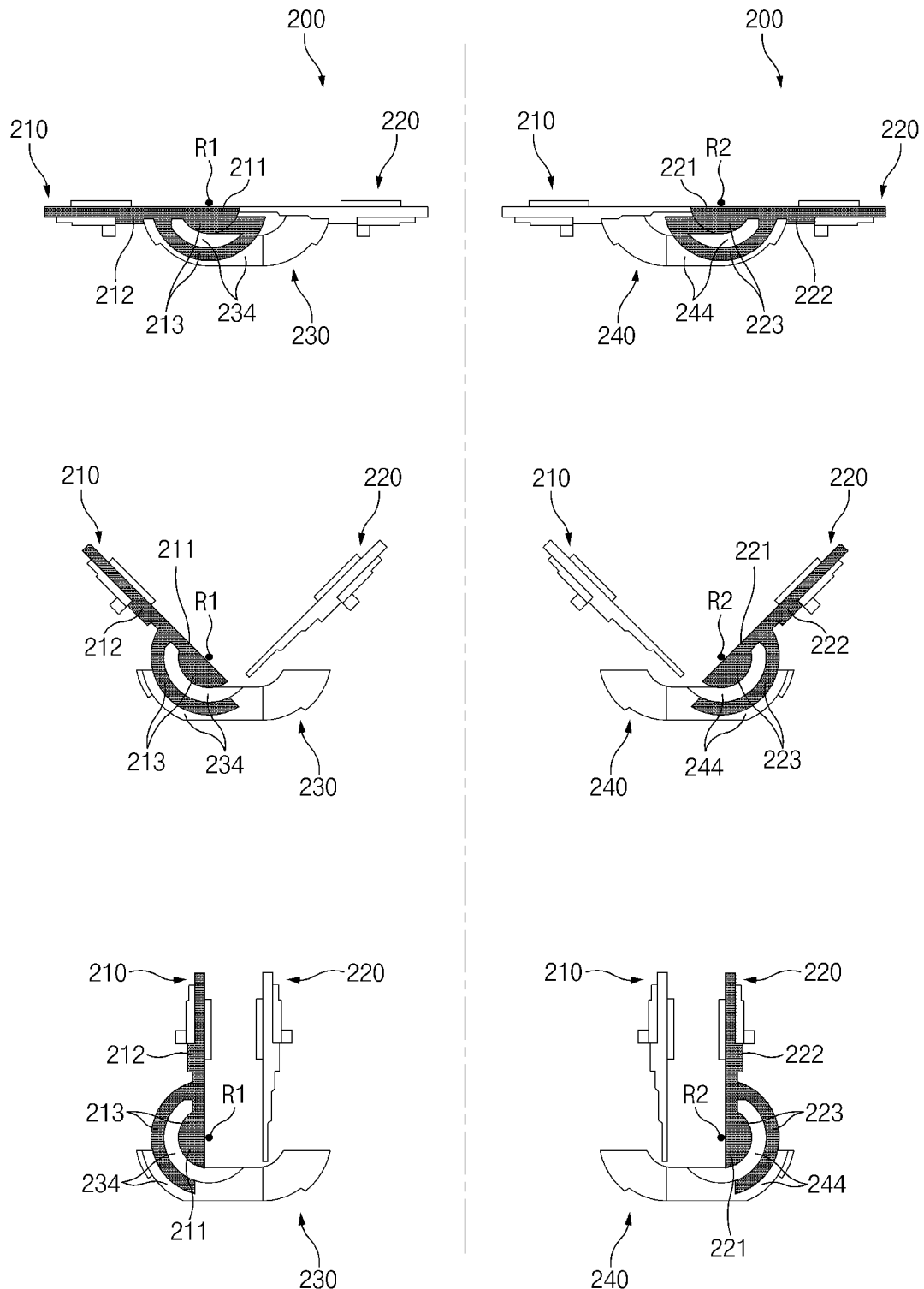
FIG. 6A and FIG. 6B are views illustrating an embodiment of rotation of a rotatable structure of a hinge structure.

FIG. 6A and FIG. 6B are views illustrating an embodiment of rotation of the rotatable structure of the hinge structure.

FIG. 6A is a view illustrating rotation of the first rotatable structure 210 with respect to the first fixed structure 230. FIG. 6B is a view illustrating rotation of the second rotatable structure 220 with respect to the second fixed structure 240.

In an embodiment, the first rotation axis R1 and the second rotation axis R2 may be parallel to the axial direction of the hinge structure 200. In an embodiment, the first rotation axis R1 and the second rotation axis R2 may be formed at locations that are spaced apart in the z axis direction (e.g., the z axis direction of FIGS. 1 to 2C) from the first extending part 212 of the first rotatable structure 210 and the second extending part 222 of the second rotatable structure 220.

In an embodiment, the first guide rail 234 may be formed in the first fixed structure 230. The first guide rail 234 illustrated in FIG. 6A is formed in the third side wall (e.g., the third side wall 233 of FIG. 4), but the disclosure is not limited thereto, and the first guide rail 234 may be formed in the second side wall (e.g., the second side wall 232 and/or the third side wall 233 of FIG. 4).

In an embodiment, the first guide rail 234 may have a substantially arc shape. In an embodiment, a center of an arc of the first guide rail 234 may be the first rotation axis R1, for example. In an embodiment, the first guide rail 234 may guide the first rotatable structure 210 such that the first rotatable structure 210 is rotated along a rotation path, a center of which is the first rotation axis R1, for example.

In an embodiment, the first rotatable structure 210 may include the first extending part 212 and the first coupling structure 211. The first coupling structure 211 may have a substantially cylindrical shape. In an embodiment, a cross-section of the first coupling structure 211 may have a substantially arc shape, for example. In an embodiment, the first rotatable structure 210 may be rotated about the first rotation axis R1 while the first guide portion 213 of the first coupling structure 211 is accommodated in the first guide rail 234 of the first fixed structure 230. In an embodiment, when the first extending part 212 is folded or unfolded together with the first housing 110, the first rotatable structure 210 may be rotated along an arc-shaped rotation path, a center of which is the first rotation axis R1, for example.

In an embodiment, the first extending part 212 may restrict a direction, in which the first rotatable structure 210 is rotatable, to one in the unfolded state. In an embodiment, a first end of the first guide rail 234 may be opened and another second end thereof may be covered by the first extending part 212, for example. Accordingly, the first rotatable structure 210 may be rotated about the first rotation axis R1 only in the clockwise direction cw and cannot be rotated in the counterclockwise direction ccw with reference to the drawings.

In an embodiment, the second guide rail 244 may be formed in the second fixed structure 240. The second guide rail 244 illustrated in FIG. 6B is formed in the sixth side wall (e.g., the sixth side wall 243 of FIG. 4), but the disclosure is not limited thereto, and the second guide rail 244 may be formed in the fifth side wall (e.g., the fifth side wall 242 and/or the sixth side wall 243 of FIG. 4).

In an embodiment, the second guide rail 244 may have a substantially arc shape. In an embodiment, a center of an arc of the second guide rail 244 may be the second rotation axis R2, for example. In an embodiment, the second guide rail 244 may guide the second rotatable structure 220 such that the second rotatable structure 220 is rotated along a rotation path, a center of which is the second rotation axis R2.

In an embodiment, the second rotatable structure 220 may include the second extending part 222 and the second coupling structure 221. The second coupling structure 221 may have a substantially cylindrical shape. In an embodiment, a cross-section of the second coupling structure 221 may have a substantially arc shape, for example. In an embodiment, the second rotatable structure 220 may be rotated about the second rotation axis R2 while the second guide portion 223 of the second coupling structure 221 is accommodated in the second guide rail 244 of the second fixed structure 240. In an embodiment, when the second extending part 222 is folded or unfolded together with the second housing 120, the second rotatable structure 220 may be rotated along an arc-shaped rotation path, a center of which is the second rotation axis R2, for example.

In an embodiment, the second extending part 222 may restrict a direction, in which the second rotatable structure 220 is rotatable, to one in the unfolded state. In an embodiment, a first end of the second guide rail 244 may be opened and another second end thereof may be covered by the second extending part 222, for example. Accordingly, the second rotatable structure 220 may be rotated about the second rotation axis R2 only in the counterclockwise direction ccw and cannot be rotated in the clockwise direction cw in an unfolding operation.

Figure 7A:
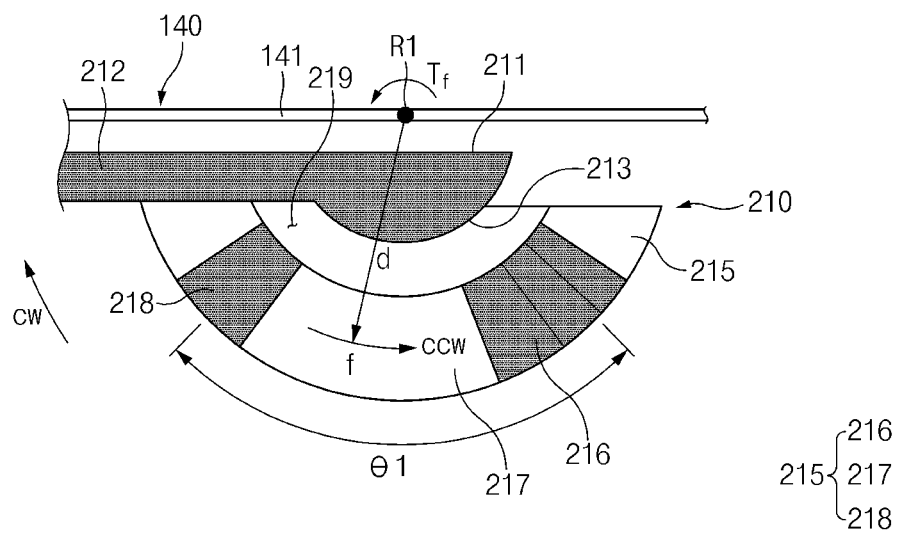
FIG. 7A and FIG. 7B are views illustrating an embodiment of a rotatable structure of a hinge structure.
Figure 7B:
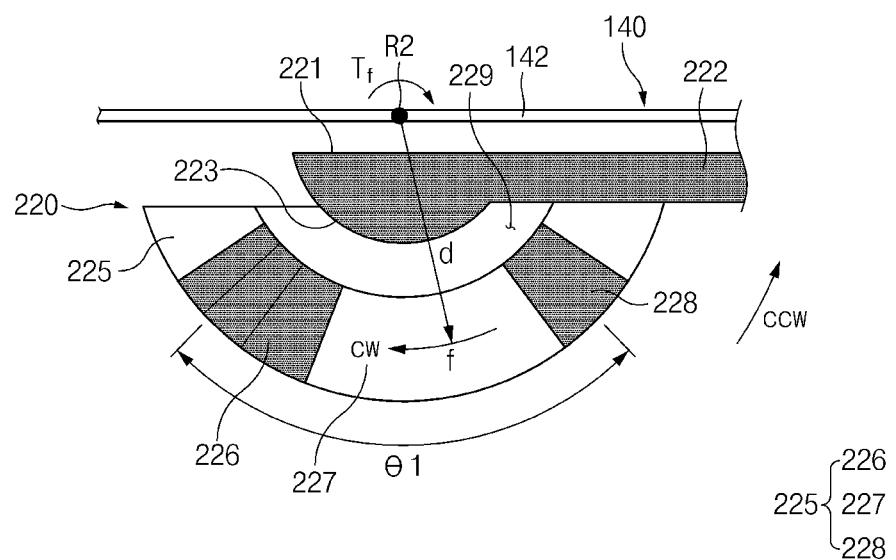

FIG. 7A and FIG. 7B are views illustrating an embodiment of the rotatable structure of the hinge structure.

The display 140 may at least partially face the first extending part 212 of the first rotatable structure 210 and the second extending part 222 of the second rotatable structure 220. In an embodiment, the first area 141 of the display 140 may at least partially face the first extending part 212, and the second area 142 of the display 140 may at least partially face the second extending part 222, for example. The first rotation axis R1 and the second rotation axis R2 may be defined at locations that overlap the display 140 when viewed in the axial direction.

In an embodiment, the first rotatable structure 210 illustrated in FIG. 6A and FIG. 6B is a part that is adjacent to the third side wall 233 of the first fixed structure 230 of FIG. 4, and the first rotatable structure 210 illustrated in FIG. 7A is a part that is adjacent to the second side wall 232 of the first fixed structure 230 of FIG. 4.

In an embodiment, the first rotatable structure 210 may include the first coupling structure 211 and the first extending part 212. The first extending part 212 may extend in a direction that is parallel to the first area 141 of the display 140 in the unfolded state. The first coupling structure 211 may have a cylindrical shape, a cross-section of which is arc-shaped. The first coupling structure 211 may include the first guide portion 213 that is coupled to the first guide rail 234 of the first fixed structure 230, and the first cam structure 215 that contacts the first moving cam 251 of the first cam member 250. A space 219, in which at least a portion of the first guide rail 234 is accommodated, may be formed between the first cam structure 215 and the first rotation axis R1.

Figure 9:
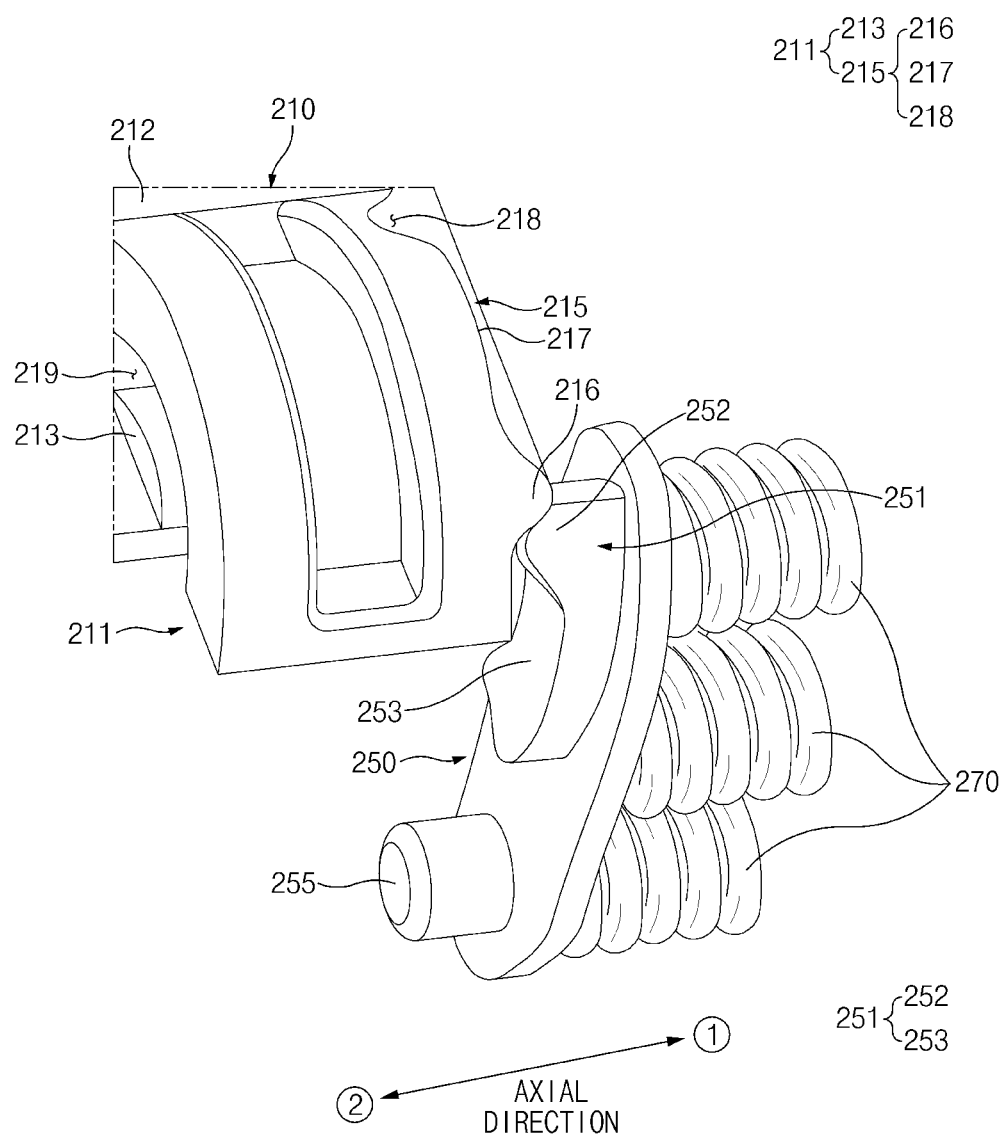
FIG. 9 is a view illustrating an embodiment of coupling of a rotatable structure and a cam member of a hinge structure.

In an embodiment, the first cam structure 215 may at least partially contact the first moving cam (e.g., the first moving cam 251 of FIG. 9). When the first rotatable structure 210 is rotated about the first rotation axis R1, a frictional force "f" due to the contact with the first moving cam 251 may be applied to the first cam structure 215. Then, the frictional force "f" may be applied in a direction that is opposite to the rotational direction of the first rotatable structure 210. In an embodiment, when the first rotatable structure 210 is rotated in the clockwise direction cw, the frictional force "f" applied to the first cam structure 215 may be applied in the counterclockwise direction ccw, for example. The frictional force "f" may form a frictional torque Tf applied to the first rotatable structure 210. The frictional torque Tf may be proportional to distances from points, at which the frictional force "f" between the first cam structure 215 and the first moving cam 251 and the frictional force from the first rotation axis R1 are applied.

In an embodiment, the frictional force "f" may be proportional to a vertical drag applied in the axial direction. In an embodiment, as the first elastic member (e.g., the first elastic member 270 of FIG. 9) presses the first cam member (e.g., the first cam member 250 of FIG. 9) more strongly, the frictional force "f" and the frictional torque Tf may increase, for example. That is, the frictional torque Tf applied to the first rotatable structure 210 may increase as the first elastic member 270 is compressed further.

The hinge structure 200 in an embodiment may be configured such that the first cam structure 215 is disposed farther than the first guide portion 213 when viewed in a radial direction of the first rotation axis R1. In an embodiment, the first cam structure 215 may be formed adjacent to an outer surface of an arc shape of the first rotatable structure 210 when viewed in a cross-section that is perpendicular to the axial direction, for example. Accordingly, when a frictional force "f" of a predetermined magnitude is assumed, a distance "d" from the first rotation axis R1 to a point, at which the frictional force "f" is generated, and the frictional force may be increased due to the increased distance.

In an embodiment, the first cam structure 215 may include a third area 217 that is substantially flat, a third protruding part 216, and a third recessed part 218. The third protruding part 216 may include a portion that protrudes from the third area 217 in the axial direction. The third recessed part 218 may include a portion that is recessed from the third area 217 in the axial direction. In various embodiments, the third protruding part 216 and/or the third recessed part 218 may be formed at locations that are spaced apart from each other by a first angle θ1 when viewed in a circumferential direction of the first rotation axis R1. In an embodiment, when the first rotatable structure 210 is rotated by the first angle θ1, a state, in which the frictional force "f" is applied to the third protruding part 216, may be changed to a state, in which the frictional force "f" is applied to the third recessed part 218, for example. In an embodiment, the state, in which the frictional force "f" is applied to the third protruding part 216, is a state, in which a relatively substantially high frictional torque Tf is present, and the state, in which the frictional force is applied to the third recessed part 218, may be a state, in which a relatively substantially low frictional torque Tf is present, for example.

In this way, the first rotatable structure 210 may include the third protruding part 216 and/or the third recessed part 218 that is formed at a predetermined location such that various frictional torques Tf are provided according to a rotation state of the first rotatable structure 210.

In an embodiment, the second rotatable structure 220 illustrated in FIGS. 6A and 6B is a part that is adjacent to the sixth side wall 243 of the second fixed structure 240 of FIG. 4, and the second rotatable structure 220 illustrated in FIG. 7B is a part that is adjacent to the fifth side wall 242 of the second fixed structure 240 of FIG. 4.

In an embodiment, the second rotatable structure 220 may include the second coupling structure 221 and the second extending part 222. The second extending part 222 may extend in a direction that is parallel to the second area 142 of the display 140 in the unfolded state. The second coupling structure 221 may have a cylindrical shape, a cross-section of which is arc-shaped. The second coupling structure 221 may include the second guide portion 223 that is coupled to the second guide rail 244 of the second fixed structure 240, and the second cam structure 225 that contacts the second moving cam (e.g., the second moving cam 261 of FIG. 4) of the second cam member 260. A space 229, in which at least a portion of the second guide rail 244 is accommodated, may be formed between the second cam structure 225 and the second rotation axis R2.

In an embodiment, the second cam structure 225 may at least partially contact the second moving cam (e.g., the second moving cam 261 of FIG. 4). When the second rotatable structure 220 is rotated about the second rotation axis R2, a frictional force "f" due to the contact with the second moving cam 261 may be applied to the second cam structure 225. Then, the frictional force "f" may be applied in a direction that is opposite to the rotational direction of the second rotatable structure 220. In an embodiment, when the second rotatable structure 220 is rotated in the counterclockwise direction ccw, the frictional force "f" applied to the second cam structure 225 may be applied in the clockwise direction cw, for example. The frictional force "f" may form a frictional torque Tf applied to the second rotatable structure 220. The frictional torque Tf may be proportional to distances from points, at which the frictional force "f" between the second cam structure 225 and the second moving cam 261 and the frictional force "f" from the second rotation axis R2 are applied In an embodiment, the frictional force "f" may be proportional to a vertical drag applied in the axial direction. In an embodiment, as the second elastic member (e.g., the second elastic member 280 of FIG. 4) presses the second cam member (e.g., the second cam member 260 of FIG. 4) more strongly, the frictional force "f" and the frictional torque Tf may increase, for example. That is, the frictional torque Tf applied to the second rotatable structure 220 may increase as the second elastic member 280 is compressed further.

The hinge structure 200 in an embodiment may be configured such that the second cam structure 225 is disposed farther than the second guide portion 223 when viewed in a radial direction of the second rotation axis R2. In an embodiment, the second cam structure 225 may be formed adjacent to an outer surface of an arc shape of the second rotatable structure 220 when viewed in a cross-section that is perpendicular to the axial direction, for example. Accordingly, when a frictional force "f" of a predetermined magnitude is assumed, a distance "d" from the second rotation axis R2 to a point, at which the frictional force "f" is generated, and the frictional torque Tf may be increased due to the increased distance.

In an embodiment, the second cam structure 225 may include a fourth area 227 that is substantially flat, a fourth protruding part 226, and a fourth recessed part 228. The fourth protruding part 226 may include a portion that protrudes from the fourth area 227 in the axial direction. The fourth recessed part 228 may include a portion that is recessed from the fourth area 227 in the axial direction. In various embodiments, the fourth protruding part 226 and/or the fourth recessed part 228 may be formed at locations that are spaced apart from each other by the first angle θ1 when viewed in a circumferential direction of the second rotation axis R2. In an embodiment, when the second rotatable structure 220 is rotated by the first angle θ1, a state, in which the frictional force "f" is applied to the fourth protruding part 226, may be changed to a state, in which the frictional force "f" is applied to the fourth recessed part 228, for example. In an embodiment, the state, in which the frictional force "f" is applied to the fourth protruding part 226, is a state, in which a relatively substantially high frictional torque Tf is present, and the state, in which the frictional force "f" is applied to the fourth recessed part 228, may be a state, in which a relatively substantially low frictional torque Tf is present, for example.

In this way, the second rotatable structure 220 may include the fourth protruding part 226 and/or the fourth recessed part 228 that is formed at a predetermined location such that various frictional torques Tf are provided according to a rotation state of the second rotatable structure 220.

Figure 8A:
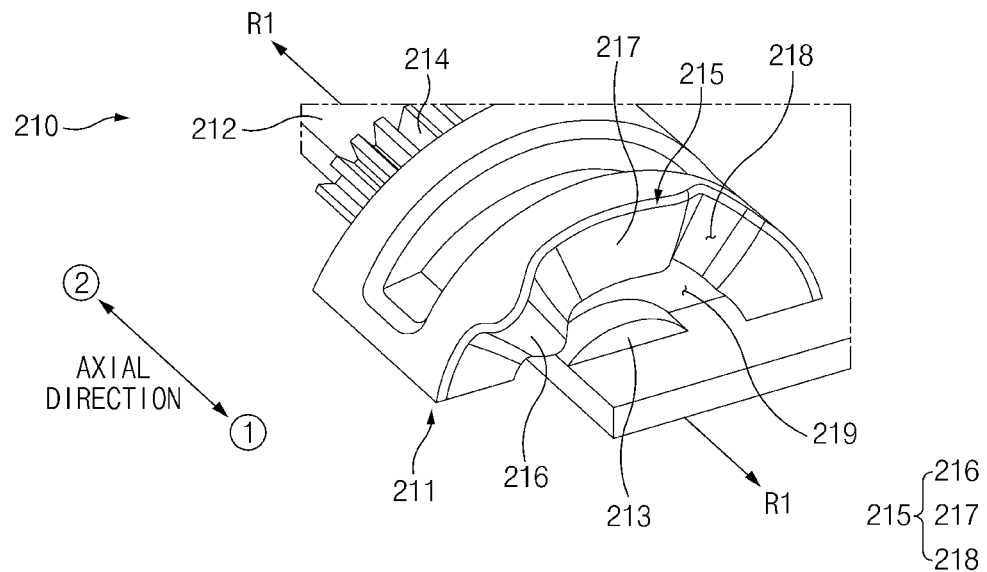
FIG. 8A and FIG. 8B are views illustrating an embodiment of a rotatable structure and a cam member of a hinge structure.
Figure 8B:
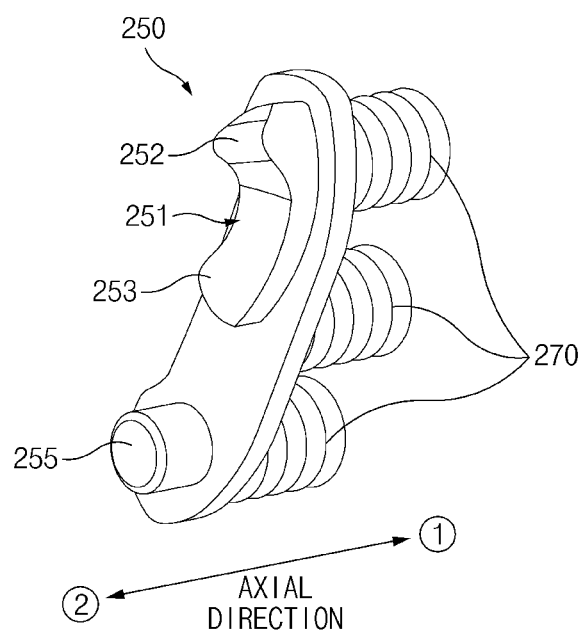

FIG. 8A and FIG. 8B are views illustrating an embodiment of the rotatable structure and the cam member of the hinge structure. FIG. 9 is a view illustrating an embodiment of coupling of the rotatable structure and the cam member of the hinge structure.

FIGS. 8A, 8B and 9 illustrate only the first rotatable structure 210 and the first cam member 250, but the contents that will be described below also may be applied to the second rotatable structure 220 and the second cam member 260 in the same way.

Referring to FIG. 8A, the first rotatable structure 210 may include the first coupling structure 211, the first extending part 212, and the first gear part 214. The first gear part 214 may be formed in the first extending part 212. The first gear part 214 may be spaced apart from the first coupling structure 211 in the axial direction. Referring to FIG. 5A and FIG. 5B together, the first gear part 214 may be connected to the first connection gear 291. The first gear part 214 may be formed in the first extending part 212, and may be formed at a location that is spaced apart from the first coupling structure 211 in the axial direction. In an embodiment, the first coupling structure 211 may be disposed between the second side wall 232 and the third side wall 233 of the first fixed structure 230, and the first gear part 214 may be disposed between the third side wall 233 of the first fixed structure 230 and the sixth side wall 243 of the second fixed structure 240, for example. The first gear part 214 may have a cylindrical shape, a center of which is the first rotation axis R1.

In an embodiment, the first coupling structure 211 may include the first guide portion 213 and the first cam structure 215. The first guide portion 213 may be formed on at least one of a side surface that faces the first axial direction (①) of the first coupling structure 211 and a side surface that faces the second axial direction (②). The space 219, in which the first guide rail 234 of the first fixed structure 230 is accommodated, may be formed between the first guide portion 213 and the first cam structure 215. In an embodiment, the first cam structure 215 may at least partially contact the first moving cam 251 of the first cam member 250. The first cam structure 215 may be formed on a side surface (e.g., a side surface of the first coupling structure 211, which faces the first axial direction (①)) of the first coupling structure 211, which faces the first moving cam 251.

In an embodiment, the first cam structure 215 may include the third area 217 that faces the first areas 253 of the first moving cam 251, the third protruding part 216 that is formed in the third area 217 and protrudes toward the first moving cam 251, and the third recessed part 218 that is recessed in the third area 217. In an embodiment, the third protruding part 216 may protrude from the third area 217 in the first axial direction (①), and the third recessed part 218 may be recessed from the third area 217 in the second axial direction (②), for example.

In an embodiment, the first cam member 250 may include the first moving cam 251 and the first linear movement guide part 255. The moving cam 251 may include the first area that is substantially flat and faces the third area 217 of the first cam structure 215, and the first protruding part 252 that protrudes from the first area 253 toward the first cam structure 215. In an embodiment, the first protruding part 252 may protrude in the second axial direction (②), for example. In an embodiment, the first linear movement guide part 255 may extend long in the axial direction to guide a linear movement path when the first cam member 250 is linearly moved in the axial direction. In an embodiment, referring to FIGS. 4 and 5, the first linear movement guide part 255 may be at least partially accommodated in the opening or the recess of the second side wall 232 of the first fixed structure 230, for example. The first linear movement guide part 255 may extend long in the second axial direction (②). In various embodiments, the first linear movement guide part 255 may protrude farther than the first protruding part 252 and the third protruding part 216. In an embodiment, in a state, in which the first protruding part 252 and the third protruding part 216 are engaged with each other such that the first area 253 and the third area 217 are spaced apart from each other maximally (a state, in which the first elastic member 270 is compressed maximally), the first linear movement guide part 255 may extend longer than a sum of protrusion heights of the first protruding part 252 and the third protruding part 216 such that a connection state to the first fixed structure 230 is maintained, for example.

Referring to FIG. 9, the first rotatable structure 210 and the first cam member 250 may be connected to each other such that the first cam structure 215 and the first moving cam 251 are engaged with each other. The first rotatable structure 210 may be disposed in the second axial direction (②) of the first cam member 250. The first elastic member 270 may be disposed in the first axial direction (①) of the first cam member 250. In an embodiment, the first cam member 250 may be disposed between the first elastic member 270 and the first rotatable structure 210, for example. In an embodiment, the first rotatable structure 210 may be rotated about the first rotation axis R1 at a location that is fixed in the axial direction. The first cam member 250 may be linearly moved in the axial direction while not being rotated.

In an embodiment, the first elastic member 270 may be compressed or prolonged according to the linear movement of the first cam member 250. In an embodiment, when the third protruding part 216 of the first cam structure 215 contacts the first protruding part 252 of the first moving cam 251 as the first rotatable structure 210 is rotated, the first cam member 250 may be moved in the first axial direction (①) and the first elastic member 270 may be in a relatively compressed state, for example. As described above, the further compressed first elastic member 270 may press the first cam member 250 stronger in a direction that faces the first rotatable structure 210, and the frictional force between the first moving cam 251 and the first cam structure 215 and the frictional torque applied to the first rotatable structure 210 may be increased. In an embodiment, when the third recessed part 218 of the first cam structure 215 contacts the first protruding part 252 of the first moving cam 251 as the first rotatable structure 210 is rotated, the first cam member 250 may be moved in the second axial direction (②) and the first elastic member 270 may be in a relatively prolonged state, for example. Then, the frictional force between the first moving cam 251 and the first cam structure 215 and the frictional torque applied to the first rotatable structure 210 may decrease.

FIGS. 10A, 10B, 10C and 10D are views illustrating an embodiment of an operation of the first torque structure of the hinge structure. FIGS. 10A, 10B, 10C and 10D illustrate only the first torque structure 201, and contents that will be described below also may be applied to the second torque structure 202 in the same way.

Figure 10C:
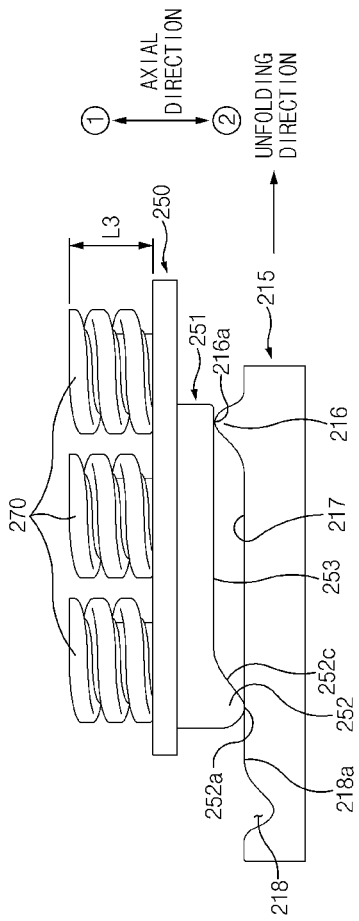
Figure 10D:
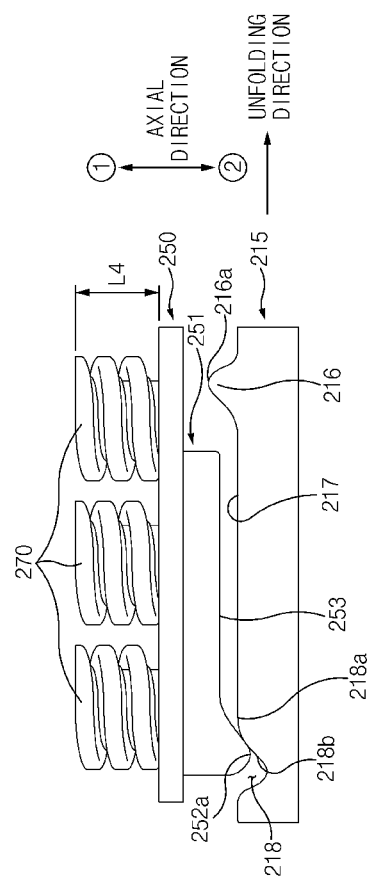

FIG. 10A illustrates the first torque structure 201 of the hinge structure 200 in the fully folded state, FIG. 10B illustrates the first torque structure 201 of the hinge structure 200 in a first state (e.g., a first state S1 of FIG. 11), FIG. 10C illustrates the first torque structure 201 of the hinge structure 200 in a free-stop section, and FIG. 10D illustrates the first torque structure 201 of the hinge structure 200 in the unfolded state.

Referring to FIGS. 2A, 2B, and 2C together, the free-stop section may include an arbitrary state (e.g., the folded state illustrated in FIG. 2B) between the unfolded state and the fully folded state. In an embodiment, the free-stop section may include a state, in which the folding area 143 of the display 140 is maintained curved, for example. In an embodiment, the free-stop section may include a state, in which the folding area of the display 140 is curved and the first periphery P1 of the first housing 110 and the second periphery P2 of the second housing 120 are spaced apart from each other, for example. In an embodiment, the free-stop section may include a state, in which the third periphery P3 of the first housing 110 and the fourth periphery P4 of the second housing 120 define an angle that is smaller than that of the unfolded state (e.g., 180 degrees), for example.

When the electronic device 100 is unfolded from the fully folded state to the unfolded state, the first rotatable structure 210 may be rotated, and the first cam structure 215 included in the first rotatable structure 210 also may be rotated together. In an embodiment, when viewed from the illustrated profile, the first cam structure 215 may be moved rightwards, for example. Then, the first moving cam 251 is not rotated, and thus may be linearly moved only in the axial direction while not being moved leftwards and rightwards. As the first moving cam 251 is moved in the axial direction, the first elastic member 270 may be compressed or prolonged. In an embodiment, the first elastic member 270 may be compressed when the first moving cam 251 is moved in the first axial direction (①), and the first elastic member 270 may be prolonged when the first moving cam 251 is moved in the second axial direction (②), for example.

Referring to FIGS. 10A, 10B, 10C and 10D, the first protruding part 252 of the first moving cam 251 may include a first point 252a that protrudes maximally in the axial direction, and a first inclined surface 252b and a second inclined surface 252c that extend from the first point 252a. The second inclined surface 252c may extend from the first point 252a to the flat first area 253. In various embodiments, the first point 252a may have a surface having an area.

Referring to FIGS. 10A, 10B, 10C and 10D, the third protruding part 216 of the first cam structure 215 may include a third point 216a that protrudes maximally in the axial direction, a fourth inclined surface 216c that extends from the third point 216a to a flat third area 217, and a third inclined surface 216b that extends from the third point 216a in an unfolding direction. In various embodiments, the fourth inclined surface 216c may be gentler than the third inclined surface 216b. In various embodiments, the third point 216a may have a surface having an area.

In the fully folded state illustrated in FIG. 10A, the first protruding part 252 of the first moving cam 251 may contact the third protruding part 216 of the first cam structure 215. In an embodiment, the first point 252a of the first protruding part 252 may contact the third inclined surface 216b of the third protruding part 216, for example. In an embodiment, the first inclined surface 252b of the first protruding part 252 may contact the third inclined surface 216b of the third protruding part 216, for example. The first point 252a of the first protruding part 252 may be disposed in the unfolding direction of the third inclined surface 216b of the third protruding part 216. Then, the first elastic member 270 may be compressed to a first length L1. Referring to FIG. 2C, because the third periphery P3 of the first housing 110 of the electronic device 100 and the fourth periphery P4 of the second housing 120 contact each other in the fully folded state Sf (refer to FIGS. 11 to 13), the first cam structure 215 cannot be moved leftwards (e.g., in the folding direction) and the hinge structure 200 cannot be folded any further.

In the first state illustrated in FIG. 10A, the first protruding part 252 of the first moving cam 251 may contact the third protruding part 216 of the first cam structure 215. In an embodiment, the first point 252a of the first protruding part 252 may contact the third point 216a of the third protruding part 216, for example. The contact may be a surface-contact or a line-contact. Then, the first elastic member 270 may be in a state, in which it is compressed as compared with in the fully folded state while having a second length L2 that is smaller than the first length L1. That is, the frictional torque applied to the first rotatable structure 210 in the first state may be higher than the frictional torque applied to the first rotatable structure 210 in the fully folded state.

Referring to FIGS. 10A and 10B, when the electronic device 100 is unfolded from the fully folded state to the first state, the first cam structure 215 may be rotated (e.g., moved rightwards with reference to the drawings) in the unfolding direction such that the third point 216a of the third protruding part 216 is moved to the first point 252a of the first protruding part 252 along the first inclined surface 252b. As the third point 216a of the first cam structure 215 is moved along the first inclined surface 252b, the first cam member 250 may be gradually moved in the first axial direction (①) and the first elastic member 270 may be gradually compressed. By the first elastic member 270 that is gradually compressed, the frictional torque applied to the first rotatable structure 210 may be increased. An increase in the frictional torque may be substantially proportional to a compression displacement L2-L1 of the first elastic member 270.

In an embodiment, to unfold the hinge structure 200 from the fully folded state to the first state, a rotational torque, by which the first elastic member 270 of a first length L1 may be compressed to a second length L2, may be desired. In an embodiment, when a rotational torque that is lower than the rotational torque desired by the first rotatable structure 210 is applied, the hinge structure 200 may not reach the first state and may be stopped at an arbitrary point, at which the frictional torque and the rotational torque is in an equilibrium state, for example.

In an embodiment, when the hinge structure 200 is in an arbitrary state between the fully folded state and the first state and no separate external force is applied, the hinge structure 200 may be moved to the fully folded state. In an embodiment, referring to FIGS. 10A, 10B, 10C and 10D together, the first elastic member 270 in the arbitrary state may be in a compression state, in which a length thereof is smaller than the first length L1 and larger than the second length L2, for example. Then, the compressed first elastic member 270 may press the first cam member 250 in the second axial direction, and the first cam structure 215 may be moved in the folding direction. That is, the third point 216a of the first cam structure 215 may be moved in the folding direction along the first inclined surface 252b of the first moving cam 251 to be moved to the fully folded state. In this way, the hinge structure 200 may provide the folded detent section illustrated in FIG. 11.

In the free-stop section illustrated in FIG. 10C, the third protruding part 216 of the first cam structure 215 may contact the first area 253 of the first moving cam 251. In an embodiment, the third point 216a of the third protruding part 216 may surface-contact or line-contact the first area 253 of the first moving cam 251, for example. In the free-stop section, the first elastic member 270 may have a third length L3. The third length L3 may be larger than the second length L2. That is, the first elastic member 270 may be prolonged in the free-stop section as compared with the first state or the fully folded state. When the hinge structure 200 is unfolded or folded in the free-stop section, the first elastic member 270 may be maintained in a predetermined compression state while having the predetermined third length L3.

Referring to FIGS. 10B and 10C, when the hinge structure 200 is unfolded from the first state to the free-stop section, the first cam structure 215 may be rotated such that the third point 216a of the third protruding part 216 is moved to the first area 253 along the second inclined surface 252c. As the third point 216a of the first cam structure 215 is moved along the second inclined surface 252c, the first cam member 250 may be gradually moved in the second axial direction (②) and the first elastic member 270 may be gradually prolonged. By the first elastic member 270 that is gradually prolonged, the frictional torque applied to the first rotatable structure 210 may be decreased. A decrease in the frictional torque may be substantially proportional to a prolonged displacement L3-L2 of the first elastic member 270.

In an embodiment, the hinge structure 200 that is in an arbitrary state between the first state and the free-stop section may be unfolded with no separate external force. In an embodiment, the first elastic member 270 may press the first cam member 250 in the second axial direction (②) and the first cam structure 215 may be moved in the unfolding direction, for example. In an embodiment, the third point 216a of the first cam structure 215 may be moved to the first area 253 along the second inclined surface 252c that is gentle, for example.

In various embodiments, when a trigger that acts on the electronic device 100 in the fully folded state such that an included angle that is larger than a first included angle (e.g., a first included angle A1 of FIG. 11) in the first state is provided, the electronic device 100 and the hinge structure 200 may be automatically unfolded to the state included in the free-stop section.

In the unfolded state illustrated in FIG. 10D, the first protruding part 252 of the first moving cam 251 may be at least partially accommodated in the third recessed part 218 of the first cam structure 215. In an embodiment, the first point 252a of the first protruding part 252 may contact the fifth inclined surface 218b of the third recessed part 218, for example. In an embodiment, the second inclined surface 252c and the fifth inclined surface 218b may contact each other, for example. Then, the first elastic member 270 may be compressed to a fourth length L4. Referring to FIG. 6A, because the first extending part 212 of the first rotatable structure 210 is supported by the fixed structure 230 in the unfolded state Su (refer to FIGS. 11 to 13), the first cam structure 215 cannot be moved rightwards (e.g., in the unfolding direction) and the hinge structure 200 cannot be unfolded any further even when the first elastic member 270 presses the first cam member 250 in the second axial direction (②).

Referring to FIGS. 10C and 10D, when the hinge structure 200 is folded from the unfolded state, the first cam structure 215 may be rotated such that the fourth point 218a is moved to the first point 252a of the first protruding part 252 along the second inclined surface 252c. The fourth point 218a may be a point that is disposed on a border of the fifth inclined surface 218b of the third recessed part and the third area 217. In an embodiment, as the fourth point 218a of the first cam structure 215 is moved along the second inclined surface 252c, the first cam member 250 may be gradually moved in the first axial direction (①) and the first elastic member 270 may be gradually compressed, for example. By the first elastic member 270 that is gradually compressed, the frictional torque applied to the first rotatable structure 210 may be increased. An increase in the frictional torque may be substantially proportional to a compression displacement L4-L3 of the first elastic member 270.

In an embodiment, to fold the hinge structure 200 from the unfolded state to the free-stop state, a rotational torque, by which the first elastic member 270 of a fourth length L4 may be compressed to the third length L3, may be desired. In an embodiment, when a rotational torque that is lower than the rotational torque desired by the first rotatable structure 210 is applied, the hinge structure 200 may not enter the free-stop section and may be stopped at an arbitrary point, at which the frictional torque and the rotational torque is in an equilibrium state, for example.

In an embodiment, when the hinge structure 200 is in an arbitrary state between the unfolded state and the free-stop section and no separate external force is applied, the hinge structure 200 may be moved to the unfolded state. In an embodiment, the first elastic member 270 in the arbitrary state may be in a compression state, in which a length thereof is smaller than the fourth length L4 and larger than the third length L3, for example. Then, the first elastic member 270 may press the first cam member 250 in the second axial direction (②) and the first cam structure 215 may be moved in the unfolding direction. That is, the fourth point 218a of the first cam structure 215 may be moved in the unfolding direction along the second inclined surface 252c of the first moving cam 251 to be moved to the unfolded state. In this way, the hinge structure 200 may provide the unfolded detent section illustrated in FIG. 11.

Figure 11:
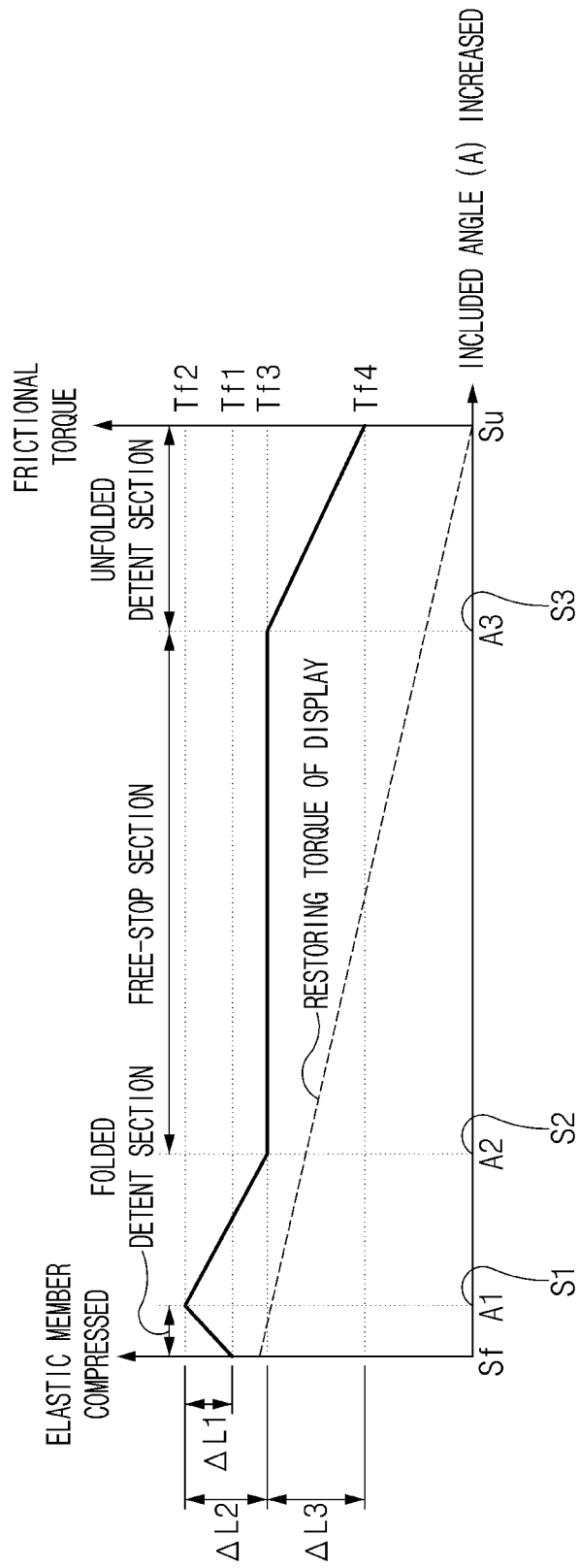
FIG. 11 is a graph depicting compression of an embodiment of an elastic member according to an included angle of a hinge structure.

FIG. 11 is a graph depicting compression of an embodiment of the elastic member according to the included angle of the hinge structure, e.g., a graph depicting an operation of the hinge structure illustrated in FIGS. 10A, 10B, 10C and 10D.

A transverse axis of the illustrated graph may mean an included angle "A". The hinge structure 200 and/or the electronic device may include various states defined by the included angle "A" formed by the first housing 110 and the second housing 120. In various embodiments, referring to FIG. 6A, the included angle "A" may be an angle defined by the first extending part 212 of the first rotatable structure 210 and the second extending part 222 of the second rotatable structure 220. Referring to FIGS. 2A to 2C, the included angle "A" may include an angle defined by a normal vector n1 of the first area 141 of the display 140 and a normal vector n2 of the second area 142, an angle defined by the third periphery P3 and the fourth periphery P4, and an angle defined by the first housing 110 and the second housing 120.

A longitudinal axis of the illustrated graph may mean compression of the elastic members 270 and 280. In an embodiment, it may mean that the elastic members 270 and 280 are compressed as they go toward the (+) direction, for example. In an embodiment, referring to FIGS. 10A, 10B, 10C and 10D, it may mean that the first cam member 250 is linearly moved in the first axial direction (①) and the second cam member 260 is linearly moved in the second axial direction (②) as they go toward the (+) direction, for example.

Referring to FIG. 11, the folding area 143 that is a curved surface of the display 140 in the folded state (e.g., FIG. 2B) and the fully folded state (e.g., FIG. 2C) may have characteristics of being deformed to a plane. Due to the characteristics, a restoring torque in the unfolding direction may be applied to the first housing 110, the first rotatable structure 210, the second housing 120, and the second rotatable structure 220. Referring to FIG. 11, the restoring torque of the display may be highest in the fully folded state Sf and lowest in the unfolded state Su. In an embodiment, the restoring torque of the display in the unfolded state Su may be 0, for example. In an embodiment, the restoring torque of the display may become higher as a thickness of the display 140 becomes larger than an area of the display 140 becomes larger, for example. Referring to FIG. 11, it is illustrated that the restoring torque of the display linearly decreases, but the disclosure is not necessarily limited thereto.

The restoring torque of the display may act on the electronic device 100 such that the hinge structure 200 and the electronic device 100 in the folded state S1, S2, and S3 or the fully folded state Sf are unfolded. Accordingly, the hinge structure 200 in an embodiment may provide a frictional torque Tf that is higher than the restoring torque of the display. The frictional torque Tf may be provided by the first elastic member 270 and the second elastic member 280 that are compressed. In an embodiment, referring to FIG. 11, the hinge structure 200 may provide the frictional torque Tf that is higher than the restoring torque of the display in all sections between the fully folded state Sf and the unfolded state Su, for example. In particular, the hinge structure 200 may provide a torque (e.g., a first frictional torque Tf1) that is higher than the restoring torque of the display in the fully folded state Sf, in which the highest restoring torque of the display is applied. Accordingly, the electronic device 100 may stably maintain the fully folded state SF with no separate fixing member (e.g., magnets disposed in the first housing and the second housing).

In an embodiment, the hinge structure 200 and/or the electronic device 100 may include a first state S1, in which the included angle "A" defined between the fully folded state Sf and the unfolded state Su is a first included angle A1, a second state S2, in which the included angle is a second included angle A2, and a third state S3, in which the included angle is a third included angle A3. The first included angle A1, the second included angle A2, and the third included angle A3 may be angles that are sequentially larger. In other words, the hinge structure 200 and/or electronic device 100 may be moved from the fully folded state Sf to the unfolded state Su sequentially via the first state S1, the second state S2, and the third state S3.

In an embodiment, the hinge structure 200 and/or the electronic device 100 may include the folded detent section defined from the fully folded state Sf to the first state S1, the free-stop section defined from the second state S2 to the third state S3, and the unfolded detent section defined from the third state S3 to the unfolded state Su.

In an embodiment, the hinge structure 200 may provide a first frictional torque Tf1 to the rotatable structure in the fully folded state Sf and provide a second frictional torque Tf2 to the rotatable structures 210 and 220 in the first state S1. In an embodiment, the hinge structure 200 may be configured such that the frictional torque increases as it is unfolded from the folded detent section. In an embodiment, as the included angle "A" increases in the folded detent section, the elastic members 270 and 280 may be further compressed, for example. Accordingly, when viewed in the unfolding direction (e.g., a direction, in which the included angle "A" increases), the folded detent section may have a positive inclination. An increase Tf2-Tf1 in the frictional torque in the folded detent section may be proportional to a first displacement ΔL1 of the elastic members 270 and 280. In various embodiments, the folded detent section may include a section, in which the frictional torque increases substantially linearly as the included angle "A" increases (e.g., unfolded).

In an embodiment, to allow the electronic device 100 to reach the first state S1 from the fully folded state Sf, a rotational torque, by which the elastic members 270 and 280 may be additionally compressed by the first displacement ΔL1, may be desired. The rotational torque may be a torque that acts in an opposite direction to that of the frictional torque. That is, a user may unfold the electronic device 100 in the fully folded state Sf to the first included angle "A" by applying a rotational torque that is higher than the frictional torque and increases consistently as the electronic device 100 is unfolded to the first housing 110 and the second housing 120.

In an embodiment, referring to FIGS. 10A, 10B, 10C and 10D together, the elastic members 270 and 280 may be compressed as the electronic device 100 is unfolded from the folded detent section, for example. The compressed elastic members 270 and 280 may press the cam member 250 and 260, and the frictional force between the moving cams 251 and 261 of the cam member 250 and 260 and the cam structures 215 and 225 of the rotatable structure may be increased by the pressing. A frictional torque that is increased in correspondence to the increased frictional force may be applied to the rotatable structures 210 and 220.

In various embodiments, when a torque that is lower than the frictional torque is applied to the electronic device 100 in the folded detent section, the electronic device 100 may be moved to the fully folded state Sf again by the elastic forces of the compressed elastic members 270 and 280. In an embodiment, in an unintended unfolding operation of the user, the electronic device may return to the fully folded state Sf and be maintain in the fully folded state Sf, for example.

In an embodiment, the hinge structure 200 may provide a second frictional torque Tf2 to the rotatable structures 210 and 220 in the first state S1 and provide a third frictional torque to the rotatable structures in the second state. In an embodiment, the hinge structure 200 may be configured such that the frictional torque decreases as the electronic device 100 is unfolded from the first state S1 to the second state S2. In an embodiment, as the included angle "A" increases between the first state S1 and the second state S2, the elastic members 270 and 280 may be prolonged, for example. Accordingly, a section between the first state S1 and the second state S2 may have a negative inclination when viewed in the unfolding direction (e.g., a direction, in which the included angle "A" becomes larger). A decrease Tf2-Tf3 of the frictional torque in a section between the first state S1 and the second state S2 may be proportional to the second displacement ΔL2 of the elastic members 270 and 280. In various embodiments, a section between the first state S1 and the second state S2 may include a section, in which the frictional torque decreases substantially linearly as the included angle "A" increases (e.g., unfolded).

In various embodiments, when the hinge structure 200 and/or the electronic device 100 is in an arbitrary state between the first state S1 and the second state S2, it may be moved to the second state S2 by the elastic forces of the compressed elastic members 270 and 280 even when no separate external force is applied.

In various embodiments, when viewed in the folding direction in the section between the first state S1 and the second state S2, the frictional force may linearly increases. In an embodiment, to fold the electronic device 100 from the second state S2 to the first state S1, a rotational torque, by which the elastic members 270 and 280 may be additionally compressed by the second displacement ΔL2, may be desired, for example. The rotational torque may be a torque that acts in an opposite direction to that of the frictional torque. That is, the user may fold the electronic device 100 in the second state S2 to the first state S1 by applying a rotational torque that is higher than the frictional torque and increases consistently as the electronic device 100 is folded to the first housing 110 and the second housing 120. In an embodiment, when a rotational torque in the folding direction, which is lower than the frictional torque, is applied to the electronic device 100 between the first state S1 and the second state S2, the electronic device 100 may be moved to the second state S2 again by the elastic forces of the compressed elastic members 270 and 280, for example.

In an embodiment, the hinge structure 200 may provide a predetermined third frictional torque Tf3 in the free-stop section. In an embodiment, in the free-stop section, the elastic members 270 and 280 may be maintained in a predetermined compression state regardless of the included angle "A", for example. In an embodiment, referring to FIGS. 10A, 10B, 10C and 10D together, in the free-stop section, the first protruding part 252 of the first moving cam 251 of the first cam member 250 may contact the flat third area 217 of the first cam structure 215, and the third protruding part 216 of the first cam structure 215 may contact the flat first area 253 of the first cam member 250, for example. Accordingly, the cam members 250 and 260 are not moved in the axial direction, and the elastic members 270 and 280 may be maintained in a constant compression state.

In an embodiment, the hinge structure 200 may provide a third frictional torque Tf3 to the rotatable structure in the third state S3 and provide a fourth frictional torque Tf4 to the rotatable structures 210 and 220 in the unfolded state Su. In an embodiment, the hinge structure 200 may be configured such that the frictional torque decreases as it is folded from the unfolded detent section. In an embodiment, as the included angle "A" increases in the unfolded detent section, the elastic members 270 and 280 may be further compressed, for example. Accordingly, when viewed in the folding direction (e.g., a direction, in which the included angle "A" increases), the folded detent section may have a negative inclination. A decrease Tf3-Tf4 in the frictional torque in the unfolded detent section may be proportional to a third displacement ΔL3 of the elastic members 270 and 280. In various embodiments, the unfolded detent section may include a section, in which the frictional torque decreases substantially linearly as the included angle "A" increases (e.g., unfolded).

When viewed in the folding direction, the frictional torque may increase in the unfolded detent section, In an embodiment, to fold the electronic device 100 from the unfolded state Su to the third state S3, a rotational torque, by which the elastic members 270 and 280 may be additionally compressed by the third displacement ΔL3, may be desired, for example. The rotational torque may be a torque that acts in an opposite direction to that of the frictional torque. That is, the user may fold the electronic device 100 in the unfolded state Su to the third state S3 by applying a rotational torque that is higher than the frictional torque and increases consistently as the electronic device 100 is folded to the first housing 110 and the second housing 120.

In an embodiment, referring to FIGS. 10A, 10B, 10C and 10D together, the elastic members 270 and 280 may be compressed as the electronic device 100 is folded from the unfolded detent section, for example. The compressed elastic members 270 and 280 may press the cam member 250 and 260, and the frictional force between the moving cams 251 and 261 of the cam member 250 and 260 and the cam structures 215 and 225 of the rotatable structures 210 and 220 may be increased by the pressing. A frictional torque that is increased in correspondence to the increased frictional force may be applied to the rotatable structures 210 and 220.

In various embodiments, when the hinge structure 200 and/or the electronic device 100 is in an arbitrary state between the third state S3 and the unfolded state Su, it may be moved to the unfolded state by the elastic forces of the compressed elastic members 270 and 280 even when no separate external force is applied. Accordingly, in an unintended unfolding operation of the user, the electronic device may return to the unfolded state Su and be maintain in the unfolded state Su.

Figure 12:
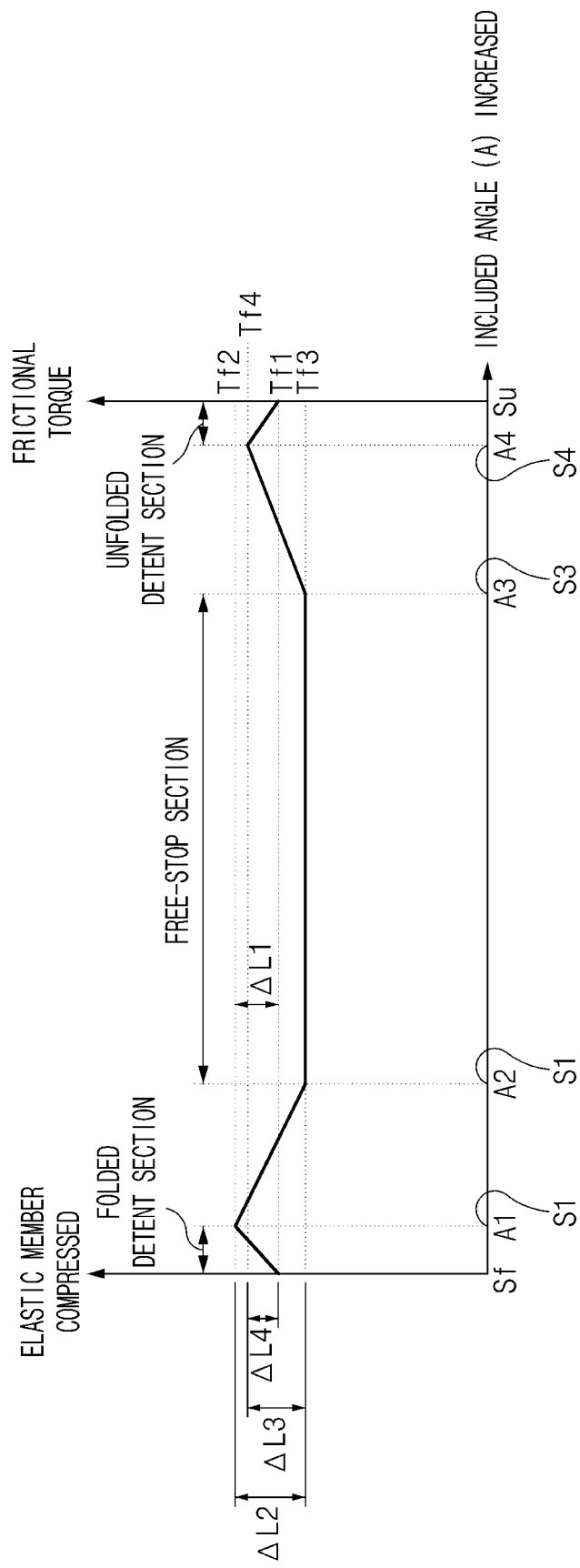
FIG. 12 is a graph depicting compression of another embodiment of an elastic member according to an included angle of a hinge structure.

FIG. 12 is a graph depicting another embodiment of compression of the elastic member according to an included angle of the hinge structure. In a description of FIG. 12, repeated contents described in FIG. 11 will be omitted.

In an embodiment, the hinge structure 200 and/or the electronic device 100 may include a first state S1, in which the included angle "A" defined between the fully folded state Sf and the unfolded state Su is a first included angle A1, a second state S2, in which the included angle is a second included angle A2, a third state S3, in which the included angle is a third included angle A3, and a fourth state S4, in which the included angle is a fourth included angle A4. The first included angle A1, the second included angle A2, the third included angle A3, and the fourth included angle A4 may be angles that are sequentially larger. In other words, the hinge structure 200 and/or the electronic device 100 may be moved from the fully folded state Sf to the unfolded state Su sequentially via the first state S1, the second state S2, the third state S3, and the fourth state S4.

In an embodiment, the hinge structure 200 and/or the electronic device 100 may include the folded detent section defined from the fully folded state Sf to the first state S1, the free-stop section defined from the second state S2 to the third state S3, and the unfolded detent section defined from the fourth state S4 to the unfolded state Su. The folded detent section and the free-stop section illustrated in FIG. 12 are the same as the folded detent section and the free-stop section illustrated in FIG. 11, and thus a description thereof will be omitted.

In an embodiment, the hinge structure 200 may provide a third frictional torque Tf3 to the rotatable structures 210 and 220 in the third state S3 and provide a fourth frictional torque Tf4 to the rotatable structures 210 and 220 in the fourth state S4.

In an embodiment, the hinge structure 200 may be configured such that the frictional torque increases as the electronic device 100 is unfolded from the third state S3 to the fourth state S4. In an embodiment, as the included angle "A" increases between the third state S3 and the fourth state S4, the elastic members 270 and 280 may be compressed, for example. Accordingly, a section between the third state S3 and the fourth state S4 may have a positive inclination when viewed in the unfolding direction (e.g., a direction, in which the included angle "A" becomes larger). An increase Tf4-Tf3 of the frictional torque in a section between the third state S3 and the fourth state S4 may be proportional to the third displacement ΔL3 of the elastic members 270 and 280. In various embodiments, a section between the third state S3 and the fourth state S4 may include a section, in which the frictional torque increases substantially linearly as the included angle "A" increases (e.g., unfolded).

In an embodiment, to fold the electronic device 100 from the third state S3 to the fourth state S4, a rotational torque, by which the elastic members 270 and 280 may be additionally compressed by the third displacement ΔL2, may be desired, for example. The rotational torque may be a torque that acts in an opposite direction to that of the frictional torque. That is, the user may unfold the electronic device 100 in the third state S3 to the fourth state S4 by applying a rotational torque that is higher than the frictional torque and increases consistently as the electronic device 100 is unfolded to the first housing 110 and the second housing 120. In an embodiment, when a rotational torque in the unfolding direction, which is lower than the frictional torque, is applied to the electronic device 100 between the third state S3 and the fourth state S4, the hinge structure 200 does not reach the fourth state S4 and may be stopped at an arbitrary point, at which the increased frictional torque and the rotational torque are in an equilibrium state, for example.

In an embodiment, when the hinge structure 200 is in an arbitrary state between the third state S3 and the fourth state S4 and no separate external force is applied, the hinge structure 200 may be moved (e.g., a folding operation) to the third state S3 by the elastic forces of the elastic members 270 and 280.

In various embodiments, the fourth frictional torque Tf4 may be the same as the second frictional torque Tf2.

In an embodiment, the hinge structure 200 may provide a fourth frictional torque Tf4 to the rotatable structures in the fourth state S4 and provide a first frictional torque Tf1 to the rotatable structures 210 and 220 in the unfolded state Su.

In an embodiment, the hinge structure 200 may be configured such that the frictional torque decreases as it is folded from the unfolded detent section. In an embodiment, as the included angle "A" increases in the unfolded detent section, the elastic members 270 and 280 may be further compressed, for example. Accordingly, when viewed in the folding direction (e.g., a direction, in which the included angle "A" increases), the folded detent section may have a negative inclination. A decrease Tf4-Tf1 in the frictional torque in the unfolded detent section may be proportional to a fourth displacement ΔL4 of the elastic members 270 and 280. In various embodiments, the unfolded detent section may include a section, in which the frictional torque decreases substantially linearly as the included angle "A" increases (e.g., unfolded).

In various embodiments, it is illustrated that the hinge structure 200 provides the same first frictional torque Tf1 in the unfolded state Su and the fully folded state Sf, but the disclosure is not limited thereto.

When viewed in the folding direction, the frictional torque may increase in the unfolded detent section, In an embodiment, to fold the electronic device 100 from the unfolded state Su to the fourth state S4, a rotational torque, by which the elastic members 270 and 280 may be additionally compressed by the fourth displacement ΔL4, may be desired, for example. The rotational torque may be a torque that acts in an opposite direction to that of the frictional torque. That is, the user may fold the electronic device 100 in the unfolded state Su to the fourth state S4 by applying a rotational torque that is higher than the frictional torque and increases consistently as the electronic device 100 is folded to the first housing 110 and the second housing 120.

In an embodiment, when a rotational torque in the folding direction, which is lower than the frictional torque, is applied to the electronic device 100 between the fourth state S4 and the unfolded state Su, the hinge structure 200 does not reach the fourth state S4 and may be stopped at an arbitrary point, at which the increased frictional torque and the rotational torque are in an equilibrium state, for example.

In various embodiments, when the hinge structure 200 and/or the electronic device 100 is in an arbitrary state between the fourth state S4 and the unfolded state Su, it may be moved to the unfolded state by the elastic forces of the compressed elastic members 270 and 280 even when no separate external force is applied. Accordingly, in an unintended unfolding operation of the user, the electronic device may return to the unfolded state Su and be maintained in the unfolded state Su.

An operation of the hinge structure 200 illustrated in FIG. 12 may be implemented by replacing the third recessed part 218 of the first cam structure 215 by an additional protruding part in the hinge structure 200 illustrated in FIGS. 10A, 10B, 10C and 10D. In an embodiment, a protrusion height of the additional protruding part may be proportional to the fourth frictional torque Tf4, for example. In an embodiment, when the protrusion height of the additional protruding part is the same as the protruding height of the third protruding part 216, the first frictional torque Tf1 of the first state S1 and the second frictional torque Tf2 of the fourth state S4 may be the same, for example.

Figure 13:
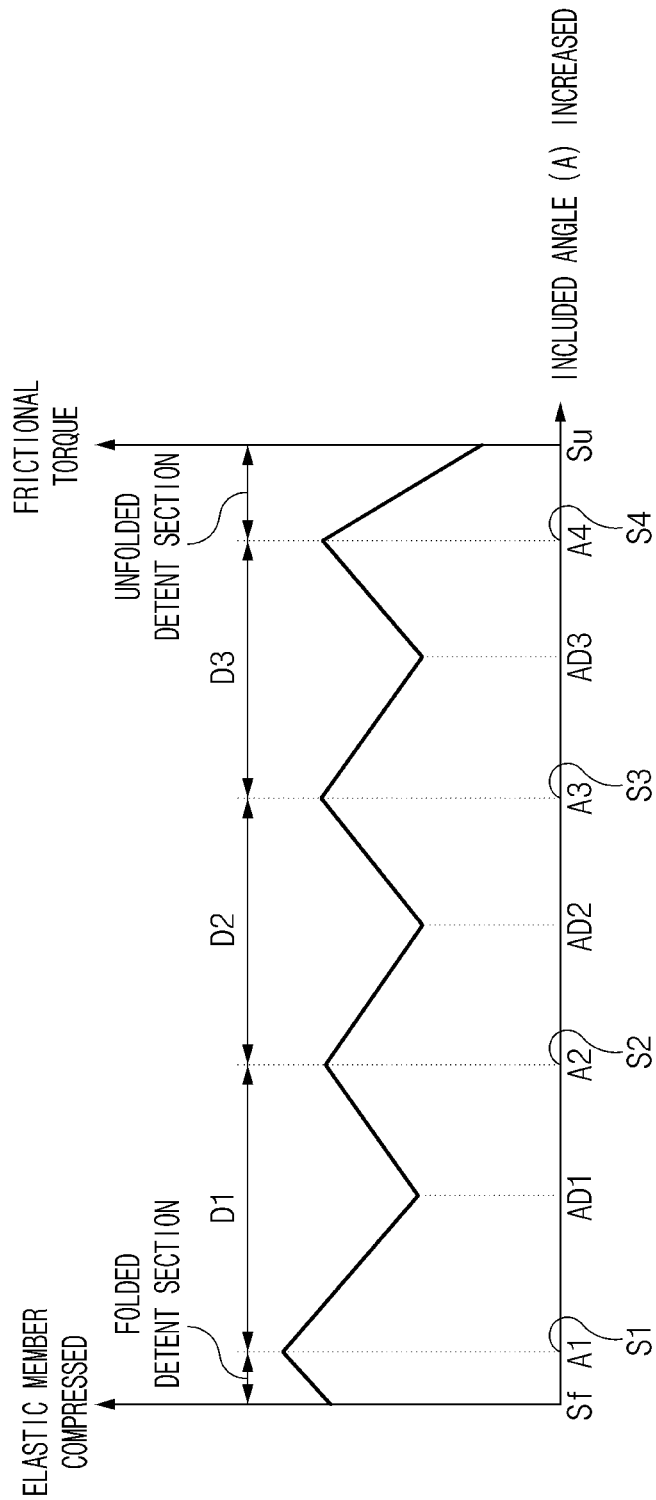
FIG. 13 is a graph depicting compression of an embodiment of an elastic member according to an included angle of a hinge structure.

FIG. 13 is a graph depicting compression of an embodiment of the elastic member according to the included angle of the hinge structure. In a description of FIG. 13, repeated contents described in FIG. 12 will be omitted. The folded detent section and the unfolded detent section of FIG. 13 are the same as those in the contents described in FIG. 2, and a description thereof will be omitted.

Referring to FIG. 13, the hinge structure 200 may include a first detent section D1, a second detent section D2, and a third detent section D3, which are defined between the folded detent section and the unfolded detent section.

The first detent section D1 may be defined by a section between the first state S1 having the first included angle A1 and the second state S2 having the second included angle A2. The first detent section D1 may be configured such that the hinge structure 200 and/or the electronic device 100 has a first detent angle AD1. The first detent angle AD1 may be an arbitrary angle defined between the first included angle A1 and the second included angle A2.

The first detent section D1 may be configured such that the elastic members 270 and 280 are compressed as the included angle "A" increases from the first detent angle AD1 and the elastic members 270 and 280 are compressed as the included angle "A" decreases. In an embodiment, the first detent section D1 may be configured such that the elastic members 270 and 280 are compressed and the frictional force increases when viewed in the unfolding direction and the folding direction from the first detent angle AD1, for example. In an embodiment, the first detent section D1 may have a negative inclination from the first state S1 to the first detent state and have a positive inclination from the first detent state to the second state S2 when viewed in an unfolding direction, in which the included angle "A" increases, for example. In an embodiment, the first detent angle AD1 may be a point, at which the negative inclination is changed to the positive inclination, for example.

In an embodiment, the first detent section D1 may be configured such that the electronic device 100 and the hinge structure 200 may be moved to the first detent state, in which they have the first detent angle AD1 when no separate external force is applied to the electronic device 100. In an embodiment, when the included angle "A" of the electronic device 100 is larger than the first included angle A1 and smaller than the first detent angle AD1, the included angle of the electronic device 100 may be increased up to the first detent angle AD1 by the elastic forces of the elastic members 270 and 280, and the electronic device 100 may be automatically unfolded with no external force, for example. In an embodiment, when the included angle "A" of the electronic device 100 is smaller than the second included angle A2 and larger than the first detent angle AD1, the included angle "A" of the electronic device 100 may be decreased up to the second detent angle AD2 by the elastic forces of the elastic members 270 and 280, and the electronic device 100 may be automatically folded with no external force, for example.

In an embodiment, for movement from the first detent section D1 to another section, a rotational torque, by which the elastic members 270 and 280 may be compressed such that the first state S1 or the second state S2 is reached, may be desired. In an embodiment, when a rotational torque that is lower than the desired rotational torque is applied, the electronic device 100 may be stopped at a point, at which the frictional torque and the rotational torque are in an equilibrium state, for example. In an embodiment, the user may move the section to another section by folding the first housing 110 and the second housing 120 to the first included angle A1 or unfolding the first housing 110 and the second housing 120 to the second included angle A2, for example.

The second detent section D2 may be defined by a section between the second state S2 having the second included angle A2 and the third state S3 having the third included angle A3. The first detent section D1 may be configured such that the hinge structure 200 and/or the electronic device 100 has a first detent angle AD1. The second detent angle AD2 may be an arbitrary angle defined between the second included angle A2 and the third included angle A3.

The second detent section D2 may be configured such that the elastic members 270 and 280 are compressed as the included angle "A" increases from the second detent angle AD2 and the elastic members 270 and 280 are compressed as the included angle "A" decreases. In an embodiment, the second detent section D2 may be configured such that the elastic members 270 and 280 are compressed and the frictional force increases when viewed in the unfolding direction and the folding direction from the second detent angle, for example. In an embodiment, the second detent section D2 may have a negative inclination from the second state S2 to the second detent state and have a positive inclination from the second detent state to the third state S3 when viewed in an unfolding direction, in which the included angle "A" increases, for example. In an embodiment, the second detent angle may be a point, at which the negative inclination is changed to the positive inclination, for example.

In an embodiment, the second detent section D2 may be configured such that the electronic device 100 and the hinge structure 200 may be moved to the second detent state, in which they have the second detent angle AD2 when no separate external force is applied to the electronic device 100. In an embodiment, when the included angle "A" of the electronic device 100 is larger than the second included angle A2 and smaller than the second detent angle AD2, the included angle of the electronic device 100 may be increased up to the second detent angle AD2 by the elastic forces of the elastic members 270 and 280, and the electronic device 100 may be automatically unfolded with no external force, for example. In an embodiment, when the included angle of the electronic device 100 is smaller than the third included angle A3 and larger than the second detent angle AD2, the included angle "A" of the electronic device 100 may be decreased to the second detent angle AD2 by the elastic forces of the elastic members 270 and 280, and the electronic device 100 may be automatically folded with no external force, for example.

In an embodiment, for movement from the second detent section D2 to another section, a rotational torque, by which the elastic members 270 and 280 may be compressed such that the second state S2 or the third state S3 is reached, may be desired. In an embodiment, when a rotational torque that is lower than the desired rotational torque is applied, the electronic device 100 may be stopped at a point, at which the frictional torque and the rotational torque are in an equilibrium state, for example. In an embodiment, the user may move the section to another section by folding the first housing 110 and the second housing 120 to the second included angle A2 or unfolding the first housing 110 and the second housing 120 to the third included angle A3, for example.

The third detent section D3 may be defined by a section between the third state S3 having the third included angle A3 and the fourth state S4 having the fourth included angle A4. The third detent section may be configured such that the hinge structure 200 and/or the electronic device 100 has the third detent angle AD3. The third detent angle AD3 may be an arbitrary angle defined between the third included angle A3 and the fourth included angle A4.

The third detent section D3 may be configured such that the elastic members 270 and 280 are compressed as the included angle "A" increases from the third detent angle AD3 and the elastic members 270 and 280 are compressed as the included angle decreases. In an embodiment, the third detent section D3 may be configured such that the elastic members 270 and 280 are compressed and the frictional force increases when viewed in the unfolding direction and the folding direction from the third detent angle AD3, for example. In an embodiment, the third detent section D3 may have a positive inclination from the third state S3 to the third detent state and have a positive inclination from the third detent state to the fourth state S4 when viewed in an unfolding direction, in which the included angle "A" increases, for example. In an embodiment, the third detent angle AD3 may be a point, at which the negative inclination is changed to the positive inclination, for example.

In an embodiment, the third detent section D3 may be configured such that the electronic device 100 and the hinge structure 200 may be moved in the third detent state, in which they have the third detent angle AD3 when no separate external force is applied to the electronic device 100. In an embodiment, when the included angle "A" of the electronic device 100 is larger than the third included angle A3 and smaller than the third detent angle AD3, the included angle "A" of the electronic device 100 may be increased up to the third detent angle AD31 by the elastic forces of the elastic members 270 and 280, and the electronic device 100 may be automatically unfolded with no external force, for example. In an embodiment, when the included angle "A" of the electronic device 100 is smaller than the fourth included angle A4 and larger than the third detent angle AD3, the included angle "A" of the electronic device 100 may be decreased up to the third detent angle AD3 by the elastic forces of the elastic members 270 and 280, and the electronic device 100 may be automatically folded with no external force, for example.

In an embodiment, for movement from the third detent section D3 to another section, a rotational torque, by which the elastic members 270 and 280 may be compressed such that the third state S3 or the fourth state S4 is reached, may be desired. In an embodiment, when a rotational torque that is lower than the desired rotational torque is applied, the electronic device 100 may be stopped at a point, at which the frictional torque and the rotational torque are in an equilibrium state, for example. In an embodiment, the user may move the section to another section by folding the first housing 110 and the second housing 120 to the third included angle A3 or unfolding the first housing 110 and the second housing 120 to the fourth included angle A4, for example.

An operation of the hinge structure 200 illustrated in FIG. 13 may be implemented by replacing the third recessed part 218 of the first cam structure 215 by another protruding part in the hinge structure 200 illustrated in FIGS. 10A, 10B, 10C and 10D, and adding a plurality of protruding parts in the third area 217. In an embodiment, to provide three detent angles AD1, AD2, and AD3, the hinge structure may include cam structures 215 and 225 that further include three additional protruding parts, for example.

Figure 14A:
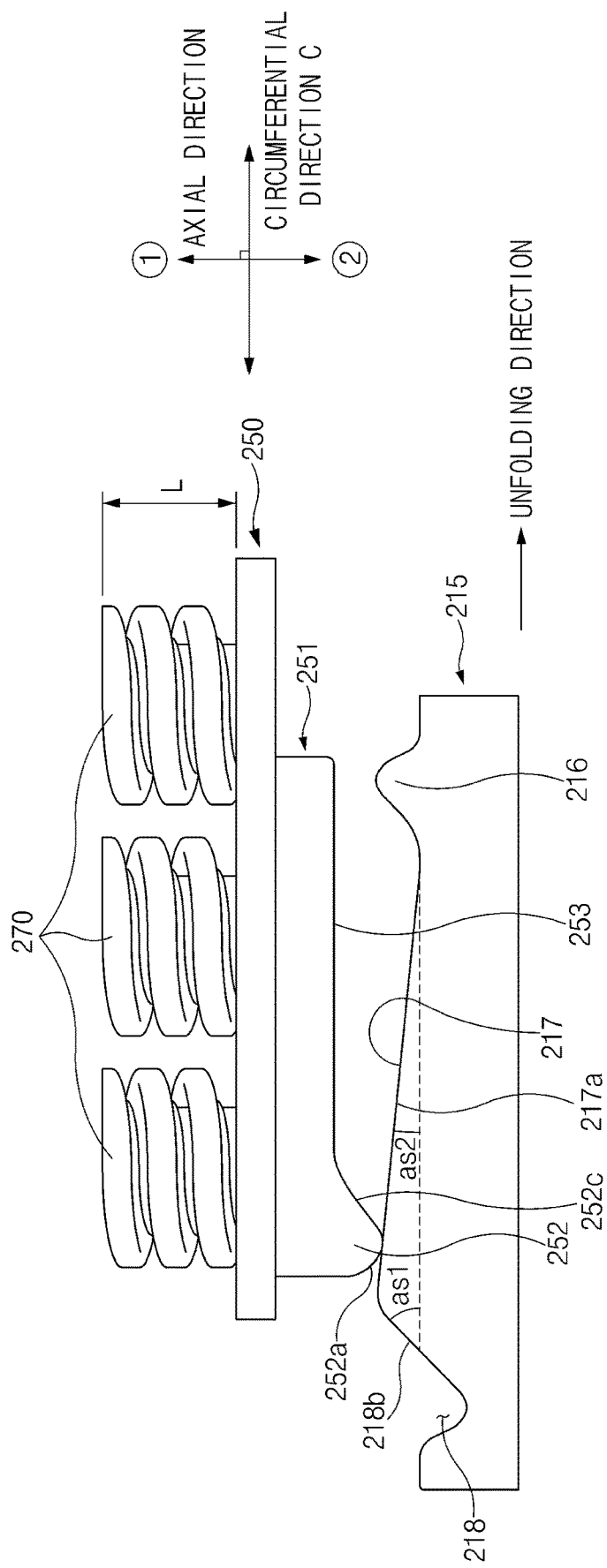
FIG. 14A is a view illustrating an embodiment of a first torque structure of a hinge structure.
Figure 14B:
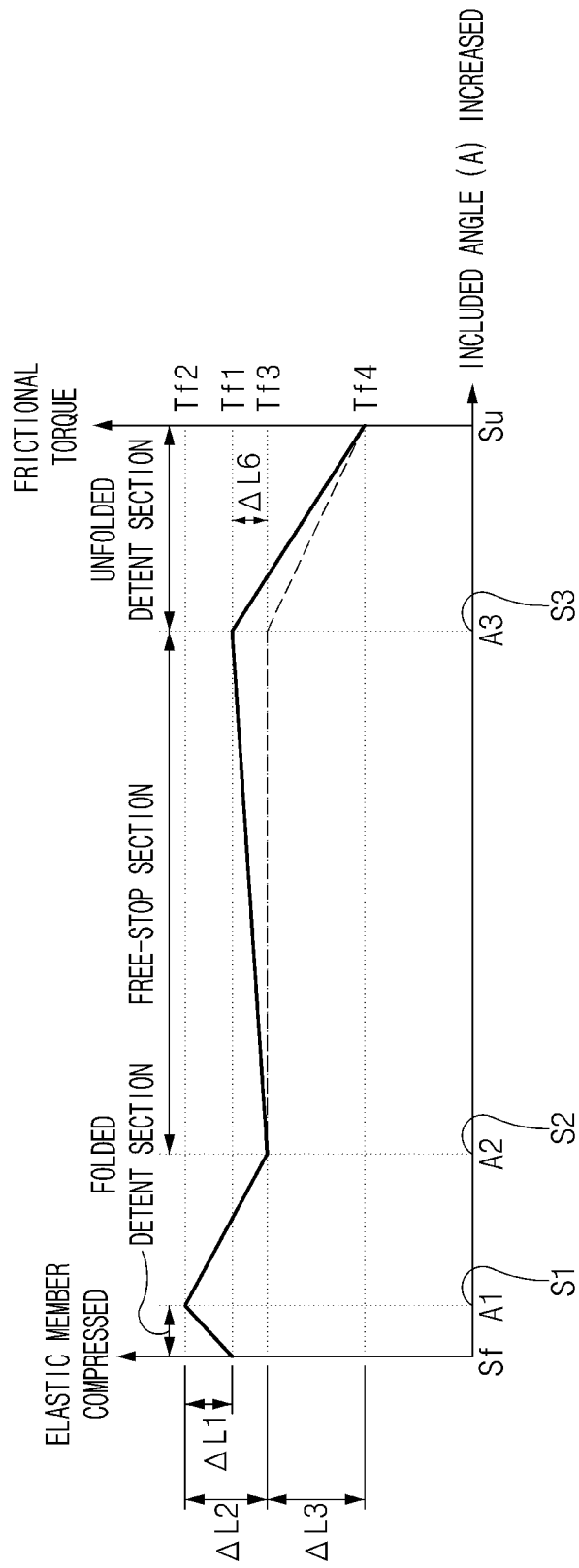
FIG. 14B is a graph depicting compression of an elastic member according to an included angle of the hinge structure illustrated in FIG. 14A.

FIG. 14A is a view illustrating an embodiment of the first torque structure of the hinge structure. FIG. 14B is a graph depicting compression of the elastic member according to the included angle of the hinge structure illustrated in FIG. 14A.

FIG. 14A illustrates only the first torque structure 201, and contents that will be described below also may be applied to the second torque structure 202 in the same way.

Referring to FIG. 14A, when the hinge structure 200 is disposed in the free-stop section, the first protruding part 252 of the first moving cam 251 may contact the third area 217 of the first cam structure 215. In an embodiment, the first protruding part 252 of the first moving cam 251 may surface-contact or line-contact the third area 217 of the first cam structure 215, for example.

When the hinge structure 200 is unfolded in the free-stop section, the first cam structure 215 may be rotated about the first rotation axis (e.g., the first rotation axis R1 of FIG. 6A), and the first moving cam 251 may be linearly moved in the axial direction. In an embodiment, according to an engagement state of the first cam structure 215 and the first moving cam 251, the first moving cam 251 may be moved in the first axial direction (①) and the first elastic member 270 may be compressed, or the first moving cam 251 may be moved in the second axial direction (②) and the first elastic member 270 may be prolonged, for example. In an embodiment, in the unfolding operation, the first cam structure 215 may be rotated in the clockwise direction cw together with the first rotatable structure 210 about the first rotation axis R1 with reference to FIG. 6A, for example. In the unfolding operation, the first cam structure 215 may be moved rightwards with reference to FIG. 14A.

In an embodiment, the third area 217 of the first cam structure 215 may be at least partially inclined. In an embodiment, the third area 217 may include a sixth inclined surface 217a, for example. The sixth inclined surface 217a may have a second inclination angle as2. In an embodiment, the second inclination angle as2 may be smaller than a first inclination angle as1 of the fifth inclined surface 218b. The first inclination angle as1 and the second inclination angle as2 may be astute angles of the angles measured with respect to a circumferential direction "C". The circumferential direction "C" may be a direction that is defined along a circumference of the first cam structure 215 with respect to the first rotation axis (e.g., the first rotation axis R1 of FIG. 7A) when the first cam structure 215 is viewed in the axial direction, and may be perpendicular to the axial direction. In an embodiment, the sixth inclined surface 217a may be inclined in the second axial direction (②) as it goes in the unfolding direction.

In an embodiment, the sixth inclined surface 217a of the first cam structure 215 may be inclined in a direction, in which the first elastic member 270 is further compressed, as the hinge structure 200 is unfolded in the free-stop section. Referring to FIG. 14A, when the hinge structure 200 is unfolded, the first cam structure 215 may be moved rightwards, and the first protruding part 252 of the first moving cam 251 may be moved in the first axial direction (①) in a state, in which it at least partially contacts the sixth inclined surface 217a. As the first moving cam 251 is moved in the first axial direction (①), a length of the first elastic member 270 may decrease and the first elastic member 270 may be compressed.

Referring to FIG. 14B, the hinge structure 200 may be configured such that the elastic members 270 and 280 are further compressed as the inclined angle "A" increases (e.g., unfolded) in the free-stop section. In an embodiment, the elastic members 270 and 280 may be further compressed by a maximum of a sixth displacement (ΔL6) when the electronic device 100 is unfolded in the free-stop section, for example. In an embodiment, the hinge structure 200 may provide a frictional torque that increases as the inclined angle "A" increases in the free-stop section.

A dotted line illustrated in FIG. 14B illustrates compression of the elastic members 270 and 280 of the hinge structure 200 including the flat third area 217 illustrated in FIGS. 10 and 11. In comparison of the dotted line and a solid line, the hinge structure 200 illustrated in FIG. 14B includes the sixth inclined surface 217a whereby the frictional torque that increases as the electronic device 100 is unfolded may be provided in the free-stop section. Because the frictional torque that increases in the free-stop section is offset by the restoring torque of the display, which acts in the unfolding direction, the electronic device 100 may be maintained in a stable folded state (e.g., FIG. 2B) in the free-stop section.

Referring to FIG. 14B, it is illustrated that the maximum frictional torque Tf1 provided by the hinge structure 200 is the same as the first frictional torque Tf1 in the fully folded state Sf, but the disclosure is not necessarily limited thereto. In an embodiment, when a ratio of compression degrees of the elastic members 270 and 280 to the increase in the included angle "A", or a ratio of the increase in the frictional torque to the increase in the included angle "A" is defined as an inclination, the hinge structure 200 may have various inclinations, for example. Then, the inclination may be related to the second inclination angle as2 of the sixth inclined surface 217a.

FIG. 14a illustrates the third area 217 including the sixth inclined surface 217a, but the disclosure is not necessarily limited thereto. In an embodiment, the first area 253 of the first moving cam 251 may include an inclined surface that is inclined in a direction, in which the first elastic member 270 is compressed as it goes in the unfolding direction in the free-stop section, for example. In an embodiment, the inclined surface included in the first area 253 may be inclined in the second axial direction as it goes in the unfolding direction.

In various embodiments, the hinge structure 200 may include a first cam (e.g., the first cam structure 215) and a second cam (e.g., the first moving cam 251) that surface-contact or line-contact each other in the free-stop section, and at least one of the first cam and the second cam may include an inclined surface (e.g., the sixth inclined surface 217a) that is inclined in a direction, in which the elastic members 270 and 280 are compressed as it goes in the unfolding direction.

In various embodiments, the hinge structure 200 may include a rotary cam (e.g., the first cam structure 215) that interlocks with the unfolding operation and the folding operation of the electronic device 100 to be rotated together, and a corresponding cam (e.g., the first moving cam 251) that is linearly moved such that the elastic members 270 and 280 are engaged with the rotary cam to be compressed. and the rotary cam may include an inclined surface (e.g., the sixth inclined surface 217a) that is inclined in a direction (e.g., the second axial direction (②) that becomes farther from the elastic members 270 and 280 in the unfolding direction and/or the corresponding cam may include an inclined surface that is inclined in a direction (e.g., the second axial direction (②)) that becomes farther from the elastic members 270 and 280 as it goes in the unfolding direction.

An electronic device in embodiments disclosed in the disclosure includes a first housing 110, a second housing 120, and a hinge structure 200 connected to the first housing 110 and the second housing 120 such that the first housing 110 and the second housing 120 are rotatable.

The hinge structure 200 in embodiments disclosed in the disclosure includes a first fixed structure 230 having an arc-shaped first guide rail 234, a center of which is a first rotation axis R1 that is parallel to an axial direction, a first rotatable structure 210 including a first coupling part 211 coupled to the first guide rail 234 to be rotatable and a first extending part 212 connected to the first housing 110. The first rotatable structure 210 rotated about the first rotation axis R1 together with the first housing 110, a first torque structure 201 that provides a torque to the first rotatable structure 210. The first torque structure 201 includes a first cam structure 215 formed in the first coupling part 211, a first cam member 250 including a first moving cam 251 engaged with the first cam structure 215, and a first elastic member 270 disposed between the first cam member 250 and a first side wall 231 of the first fixed structure 230 and that is compressed or prolonged in correspondence to linear movement of the first cam member 250, a second fixed structure 240 having an arc-shaped second guide rail 244, a center of which is a second rotation axis R2 that is parallel to the axial direction, a second rotatable structure 220 including a second coupling part 221 coupled to the second guide rail 244 to be rotatable and a second extending part 222 connected to the second housing 120. The second rotatable structure 220 be rotated about the second rotation axis R2 together with the second housing 120, and a first torque structure 202 that provides a torque to the second rotatable structure 220. The second torque structure 202 includes a second cam structure 225 formed in the second coupling part 221, a second cam member 260 including a second moving cam 261 engaged with the second cam structure 225, and a second elastic member 280 disposed between the second cam member 260 and a fourth side wall 241 of the second fixed structure 240 and that is compressed or prolonged in correspondence to linear movement of the second cam member 260.

In various embodiments, the first fixed structure 230 and the second fixed structure 240 may be unitary with each other or coupled to each other to be separable.

In various embodiments, the first rotatable structure 210 may further include a first gear part 214 including first teeth (also referred to as first gear teeth) formed on an arc surface, a center of which is the first rotation axis R1 the second rotatable structure 220 may further include a second gear part 224 including second teeth (also referred to as second gear teeth) formed on an arc surface, a center of which is the second rotation axis R2 the electronic device may further include connection gears 291, 292, and 293 disposed between the first fixed structure 230 and the second fixed structure 240 and connecting the first gear teeth and the second gear teeth, and the first rotatable structure 210 and the second rotatable structure 220 may interlock each other to be rotated at the same angle in opposite directions by the connection gears 291, 292, and 293.

In various embodiments, the first fixed structure 230 may further include a second side wall 232 and a third side wall 233, which face each other, the first moving cam 251 and the first elastic member 270 may be disposed between the first side wall 231 and the second side wall 232, the second fixed structure 240 may further include a fifth side wall 242 and a sixth side wall 243, which face each other, and the second moving cam 261 and the second elastic member 280 may be disposed between the fourth side wall 241 and the fifth side wall 242.

In various embodiments, the first cam member 250 may further include a first linear movement guide part 255 extending in the axial direction toward the second side wall 232 and accommodated in an opening or a recess defined in the second side wall 232, and the second cam member 260 may further include a second linear movement guide part 265 extending in the axial direction toward the fifth side wall 242 and accommodated in an opening or a recess defined in the fifth side wall 242.

In various embodiments, the first linear movement guide part 255 may extend longer than a movement distance of the first cam member 250 in the axial direction, and the second linear movement guide part 265 may extend longer than a movement distance of the second cam member 260 in the axial direction.

In various embodiments, the first moving cam 251 may include a first protruding part 252 protruding toward the first cam structure 215 of the first rotatable structure 210, the first cam structure 215 may include a third protruding part 216 protruding toward the first moving cam 251 of the first cam member 250, a sum of protrusion heights of the first protruding part 252 and the third protruding part 216 may be smaller than an extension length of the first linear movement guide part 255, the second moving cam 261 may include a second protruding part protruding toward the second cam structure 225 of the second rotatable structure 220, the second cam structure 225 may include a fourth protruding part 226 protruding toward the second moving cam 261 of the second cam member 260, and a sum of protrusion heights of the second protruding part and the fourth protruding part 226 may be smaller than an extension length of the second linear movement guide part 265.

In various embodiments, the first coupling part 211 of the first rotatable structure 210 may be disposed between the third side wall 233 and the fourth side wall 241, and the second coupling part 221 of the second rotatable structure 220 may be disposed between the fifth side wall 242 and the sixth side wall 243.

In various embodiments, the first guide rail 234 may include a part formed on at least one of the third side wall 233 and the fourth side wall 241 and protruding toward the first coupling part 211, and the second guide rail 244 may include a part formed on at least one of the fifth side wall 242 and the sixth side wall 243 and protruding toward the second coupling part 221.

In various embodiments, each of the first elastic member 270 and the second elastic member 280 may include a plurality of elastic members.

In various embodiments, the first coupling part 211 may include a first guide portion 213 at least partially accommodated in the first guide rail 234 and protruding in the axial direction, the first cam structure 215 may be formed at a location that is spaced apart from the first rotation axis R1 by a first distance, the first guide portion 213 may be formed at a location that is spaced apart from the first rotation axis R1 by a second distance that is smaller than the first distance, the second coupling part 221 may include a second guide portion 223 at least partially accommodated in the second guide rail 244 and protruding in the axial direction, the second cam structure 225 may be formed at a location that is spaced apart from the second rotation axis R2 by a third distance, and the second guide portion 223 may be formed at a location that is spaced apart from the second rotation axis R2 by a fourth distance that is smaller than the third distance.

In various embodiments, the first cam structure 215 may include a third area 217 facing a first area 253 of the first moving cam 251, and a third protruding part 216 formed in the third area 217 and protruding toward the first area 253 of the first moving cam 251, the first moving cam 251 may include a first protruding part 252 formed in the first area 253 and protruding toward the third area 217, the second cam structure 225 may include a fourth area 227 facing a second area of the second moving cam 261, and a fourth protruding part 226 formed in the fourth area 227 and protruding toward the second area of the second moving cam, and the second moving cam 261 may include a second protruding part formed in the second area and protruding toward the fourth area 227.

In various embodiments, when the third protruding part 216 of the first cam structure 215 is moved from the first area 253 of the first moving cam 251 to the first protruding part 252 through rotation of the first rotatable structure 210, the first cam member 250 may be linearly moved toward the first side wall 231 in the axial direction, and the first elastic member 270 is compressed, and when the fourth protruding part 226 of the second cam structure 225 is moved from the second area of the second moving cam 261 to the second protruding part through rotation of the second rotatable structure 220, the second cam member 260 may be linearly moved toward the second side wall 232 in the axial direction, and the second elastic member 280 may be compressed.

In various embodiments, the first cam structure 215 may further include a first recessed part 218 spaced apart from the first protruding part 252 when viewed in a circumferential direction of the first rotation axis R1, and the second cam structure 225 further include a fourth recessed part 228 spaced apart from the second protruding part when viewed in a circumferential direction of the second rotation axis R2.

An electronic device in embodiments disclosed in the disclosure includes a first housing 110 and a second housing 120, a display 140 disposed in the first housing 110 and the second housing 120. The display 140 includes a folding area that may be deformed to a curved surface or a flat surface, and a hinge structure 200 connecting the first housing 110 and the second housing 120 such that the first housing 110 and the second housing 120 are rotatable whereby the first housing 110 and the second housing 120 define a predetermined included angle "A".

The hinge structure 200 in embodiments disclosed in the disclosure includes a first rotatable structure 210 that is rotated about a first rotation axis R1 together with the first housing, a first elastic member 270 that is compressed and prolonged through rotation of the first rotatable structure 210, a second rotatable structure 220 that is rotated about a second rotation axis R2 together with the second housing 120, and a second elastic member 280 that is compressed or prolonged through rotation of the second rotatable structure 220, The hinge structure 200 in embodiments disclosed in the disclosure includes a folded detent section defined from a fully folded state Sf to a first state S1, in which the included angle "A" is a first included angle A1. The first elastic member 270 and the second elastic member 280 are compressed by a first displacement $\Delta L1$ as the included angle "A" increases in the folded detect section, and a free-stop section defined from a second state S2, in which the included angle "A" is a second included angle A2 that is larger than the first included angle A1, to a third state S3, in which the included angle "A" is a third included angle A3 that is larger than the second included angle A2. The first elastic member 270 and the second elastic member 280 has a predetermined compression state in the free-stop section regardless of the included angle, and the first elastic member 270 and the second elastic member 280 are in a compressed state such that a first frictional torque Tf1 that is higher than a restoring torque of the display 140 is formed in the fully folded state Sf.

In various embodiments, the first elastic member 270 and the second elastic member 280 may be prolonged as the included angle "A" increases, between the first state S1 and the second state S2.

In various embodiments, the hinge structure 200 may further include an unfolded detent section defined from the third state S3 to an unfolded state Su, and the first elastic member 270 and the second elastic member 280 may be prolonged as the included angle "A" increases in the unfolded detent section.

In various embodiments, the first elastic member 270 and the second elastic member 280 may be in a compressed state such that a third frictional torque Tf3 that is higher than a restoring torque of the display 140 is formed in the free-stop section.

In various embodiments, the hinge structure 200 may further include an unfolded detent section defined from a fourth state S4, in which the included angle "A" is a fourth included angle A4 that is larger than the third included angle A3, to a fourth state S4, and the first elastic member 270 and the second elastic member 280 may be prolonged as the included angle increases in the unfolded detent section.

In various embodiments, the first elastic member 270 and the second elastic member 280 may be compressed as the included angle "A" increases, between the third state S3 and the fourth state S4.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other feature (e.g., importance or order). It is to be understood that when an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

According to the situation, an expression "adapted to or configured to," if used in this disclosure, may be used interchangeably with the expression "suitable for", "having the capacity to", "adapted to", "made to", "capable of", or "designed to" in hardware or software, for example. The expression "a device configured to" may mean that the device is "capable of" operating together with another device or other components. A "processor set to (or configured to) perform A, B, and C" may mean a dedicated processor (e.g., an embedded processor) for performing corresponding operations or a generic-purpose processor (e.g., a CPU or an AP) that performs corresponding operations by executing one or more programs stored in a memory device (e.g., memory), for example.

As used in connection with various embodiments of the disclosure, the term "module" may include a unit implemented in hardware, software, or firmware, and may interchangeably be used with other terms, e.g., "logic," "logic block," "part," or "circuitry". A module may be a single integral component, or a minimum unit or part thereof, adapted to perform one or more functions. The "module" may be implemented mechanically or electronically and may include an application-specific integrated circuit (ASIC) chip, field-programmable gate arrays (FPGAs), or a programmable-logic device for performing some operations, for example, which are known or will be developed.

At least a part of an apparatus (e.g., modules or functions thereof) or a method (e.g., operations) in various embodiments may be implemented by instructions stored in computer-readable storage media (e.g., memory) in the form of a program module. The instructions, when executed by a processor (e.g., a processor), may cause the processor to perform functions corresponding to the instructions. The computer-readable storage media may include a hard disk, a floppy disk, a magnetic media (e.g., a magnetic tape), an optical media (e.g., CD-ROM, DVD, magneto-optical media (e.g., a floptical disk)), an embedded memory, or the like. The instructions may include a code made by a compiler or a code executable by an interpreter.

In various embodiments, each component (e.g., a module or a program) of the above-described components may include a single entity or multiple entities, and some of the multiple entities may be separately disposed in different components. In various embodiments, one or more of the above-described components may be omitted, or one or more other components may be added. In alternative or additional embodiments, a plurality of components (e.g., modules or programs) may be integrated into a single component. In such a case, in various embodiments, the integrated component may still perform one or more functions of each of the plurality of components in the same or similar manner as they are performed by a corresponding one of the plurality of components before the integration. In various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
    a first housing;
    a second housing; and
    a hinge structure which is connected to the first housing and the second housing and by which the first housing and the second housing are rotatable, the hinge structure including:
        a first fixed structure including a first guide rail which has an arc shape and a center of which is a first rotation axis that is parallel to an axial direction;
        a first rotatable structure including a first coupling part coupled to the first guide rail and rotatable and a first extending part connected to the first housing, the first rotatable structure being rotatable about the first rotation axis together with the first housing;
        a first torque structure which provides a torque to the first rotatable structure, the first torque structure including:
            a first cam structure formed in the first coupling part;
            a first cam member including a first moving cam engaged with the first cam structure; and
            a first elastic member which is disposed between the first cam member and a first side wall of the first fixed structure and is compressed or prolonged in correspondence to linear movement of the first cam member;
        a second fixed structure including a second guide rail which has an arc shape and a center of which is a second rotation axis that is parallel to the axial direction;
        a second rotatable structure including a second coupling part coupled to the second guide rail and rotatable and a second extending part connected to the second housing, the second rotatable structure being rotatable about the second rotation axis together with the second housing; and
        a second torque structure which provides a torque to the second rotatable structure, the second torque structure including:
            a second cam structure formed in the second coupling part;
            a second cam member including a second moving cam engaged with the second cam structure; and
            a second elastic member which is disposed between the second cam member and a fourth side wall of the second fixed structure and is compressed or prolonged in correspondence to linear movement of the second cam member.

2. The electronic device of claim 1, wherein the first fixed structure and the second fixed structure are unitary with each other or coupled to each other and separable.

3. The electronic device of claim 1, wherein the first rotatable structure further includes a first gear part including first gear teeth formed on an arc surface, a center of which is the first rotation axis
    wherein the second rotatable structure further includes a second gear part including second gear teeth formed on an arc surface, a center of which is the second rotation axis
    wherein the electronic device further comprises connection gears disposed between the first fixed structure and the second fixed structure and connecting the first gear teeth and the second gear teeth, and
    wherein the first rotatable structure and the second rotatable structure interlock each other and are rotated at a same angle in opposite directions by the connection gears.

4. The electronic device of claim 1, wherein the first fixed structure further includes a second side wall and a third side wall, which face each other,
    wherein the first moving cam and the first elastic member are disposed between the first side wall and the second side wall,
    wherein the second fixed structure further includes a fifth side wall and a sixth side wall, which face each other, and
    wherein the second moving cam and the second elastic member are disposed between the fourth side wall and the fifth side wall.

5. The electronic device of claim 4, wherein the first cam member further includes a first linear movement guide part extending in the axial direction toward the second side wall and accommodated in an opening or a recess defined in the second side wall, and
    wherein the second cam member further includes a second linear movement guide part extending in the axial direction toward the fifth side wall and accommodated in an opening or a recess defined in the fifth side wall.

6. The electronic device of claim 5, wherein the first linear movement guide part extends longer than a movement distance of the first cam member in the axial direction, and
    wherein the second linear movement guide part extends longer than a movement distance of the second cam member in the axial direction.

7. The electronic device of claim 5, wherein the first moving cam includes a first protruding part protruding toward the first cam structure of the first rotatable structure,
    wherein the first cam structure includes a third protruding part protruding toward the first moving cam of the first cam member,
    wherein a sum of protrusion heights of the first protruding part and the third protruding part is smaller than an extension length of the first linear movement guide part,
    wherein the second moving cam includes a second protruding part protruding toward the second cam structure of the second rotatable structure,
    wherein the second cam structure includes a fourth protruding part protruding toward the second moving cam of the second cam member, and
wherein a sum of protrusion heights of the second protruding part and the fourth protruding part is smaller than an extension length of the second linear movement guide part.

8. The electronic device of claim 4, wherein the first coupling part of the first rotatable structure is disposed between the third side wall and the fourth side wall, and
wherein the second coupling part of the second rotatable structure is disposed between the fifth side wall and the sixth side wall.

9. The electronic device of claim 8, wherein the first guide rail includes a part formed on at least one of the third side wall and the fourth side wall and protruding toward the first coupling part, and
wherein the second guide rail includes a part formed on at least one of the fifth side wall and the sixth side wall and protruding toward the second coupling part.

10. The electronic device of claim 1, wherein each of the first elastic member and the second elastic member include a plurality of elastic members.

11. The electronic device of claim 1, wherein the first coupling part includes a first guide portion at least partially accommodated in the first guide rail and protruding in the axial direction,
wherein the first cam structure is formed at a location that is spaced apart from the first rotation axis by a first distance,
wherein the first guide portion is formed at a location that is spaced apart from the first rotation axis by a second distance that is smaller than the first distance,
wherein the second coupling part includes a second guide portion at least partially accommodated in the second guide rail and protruding in the axial direction, wherein the second cam structure is formed at a location that is spaced apart from the second rotation axis by a third distance, and
wherein the second guide portion is formed at a location that is spaced apart from the second rotation axis by a fourth distance that is smaller than the third distance.

12. The electronic device of claim 1, wherein the first cam structure includes a third area facing a first area of the first moving cam, and a third protruding part formed in the third area and protruding toward the first area of the first moving cam,
wherein the first moving cam includes a first protruding part formed in the first area and protruding toward the third area,
wherein the second cam structure includes a fourth area facing a second area of the second moving cam, and a fourth protruding part formed in the fourth area and protruding toward the second area of the second moving cam, and
wherein the second moving cam includes a second protruding part formed in the second area and protruding toward the fourth area.

13. The electronic device of claim 12, wherein when the third protruding part of the first cam structure is moved from the first area of the first moving cam to the first protruding part through rotation of the first rotatable structure,
the first cam member is linearly moved toward the first side wall in the axial direction, and
the first elastic member is compressed, and
wherein when the fourth protruding part of the second cam structure is moved from the second area of the second moving cam to the second protruding part through rotation of the second rotatable structure,
the second cam member is linearly moved toward a second side wall in the axial direction, and
the second elastic member is compressed.

14. The electronic device of claim 12, wherein the first cam structure further includes a first recessed part spaced apart from the first protruding part when viewed in a circumferential direction of the first rotation axis, and
wherein the second cam structure further includes a second recessed part spaced apart from the second protruding part when viewed in a circumferential direction of the second rotation axis.

15. An electronic device comprising:
a first housing and a second housing;
a display disposed in the first housing and the second housing, wherein the display includes a folding area that is deformed to a curved surface or a flat surface; and
a hinge structure which connects the first housing and the second housing and by which the first housing and the second housing are rotatable and define a predetermined included angle, the hinge structure including:
a first rotatable structure which is rotated about a first rotation axis together with the first housing;
a first elastic member which is compressed and prolonged through rotation of the first rotatable structure;
a second rotatable structure which is rotated about a second rotation axis together with the second housing; and
a second elastic member which is compressed or prolonged through rotation of the second rotatable structure,
wherein the hinge structure includes:
a folded detent section defined from a fully folded state to a first state, in which the included angle is a first included angle, wherein the first elastic member and the second elastic member are compressed by a first displacement as the included angle increases in the folded detect section; and
a free-stop section defined from a second state, in which the included angle is a second included angle that is larger than the first included angle, to a third state, in which the included angle is a third included angle that is larger than the second included angle, wherein the first elastic member and the second elastic member has a predetermined compression state in the free-stop section regardless of the included angle, and
wherein the first elastic member and the second elastic member are in a compressed state in which a first frictional torque that is higher than a restoring torque of the display is formed in the fully folded state.

16. The electronic device of claim 15, wherein the first elastic member and the second elastic member are prolonged as the included angle increases, between the first state and the second state.

17. The electronic device of claim 15, wherein the hinge structure further includes an unfolded detent section defined from the third state to an unfolded state, and
wherein the first elastic member and the second elastic member are prolonged as the included angle increases in the unfolded detent section.

18. The electronic device of claim 15, wherein the first elastic member and the second elastic member are in a compressed state in which a third frictional torque that is higher than a restoring torque of the display is formed in the free-stop section.

19. The electronic device of claim 15, wherein the hinge structure further includes an unfolded detent section defined from a fourth state, in which the included angle is a fourth included angle that is larger than the third included angle, to an unfolded state, and wherein the first elastic member and the second elastic member are prolonged as the included angle increases in the unfolded detent section.

20. The electronic device of claim 19, wherein the first elastic member and the second elastic member are compressed as the included angle increases, between the third state and the third state.

* * * * *